US008445419B2

(12) United States Patent
Timothy et al.

(10) Patent No.: US 8,445,419 B2
(45) Date of Patent: May 21, 2013

(54) ANTIMICROBIAL COMPOSITIONS FOR USE ON FOOD PRODUCTS

(75) Inventors: Gutzmann Allen Timothy, Eagan, MN (US); Scott L. Burnett, St. Paul, MN (US); Richard Keith Staub, Lakeville, MN (US); Erin Mertz, Eden Prairie, MN (US); Seth Young Raley, Minneapolis, MN (US)

(73) Assignee: Ecolab USA Inc., St. Paul, MN (US)

( * ) Notice: Subject to any disclaimer, the term of this patent is extended or adjusted under 35 U.S.C. 154(b) by 288 days.

(21) Appl. No.: 12/785,251

(22) Filed: May 21, 2010

(65) Prior Publication Data
US 2010/0297316 A1 Nov. 25, 2010

Related U.S. Application Data

(63) Continuation-in-part of application No. 11/459,069, filed on Jul. 21, 2006, now Pat. No. 7,915,207, and a continuation-in-part of application No. 11/779,596, filed on Jul. 18, 2007.

(60) Provisional application No. 60/702,243, filed on Jul. 25, 2005, provisional application No. 60/807,956, filed on Jul. 21, 2006.

(51) Int. Cl.
*C11D 1/83* (2006.01)
(52) U.S. Cl.
USPC ........................................................ 510/111
(58) Field of Classification Search
USPC ........................................................ 510/111
See application file for complete search history.

(56) References Cited

U.S. PATENT DOCUMENTS

| | | | |
|---|---|---|---|
| 2,858,225 A | 10/1958 | Gooding et al. | |
| 3,057,735 A | 10/1962 | Ottke et al. | |
| 3,443,972 A | 5/1969 | Dimarco et al. | |
| 3,867,300 A | 2/1975 | Karabinos et al. | |
| 4,002,775 A | 1/1977 | Kabara | |
| 4,067,997 A | 1/1978 | Kabara | |
| 4,404,040 A | 9/1983 | Wang | |
| 4,647,458 A | 3/1987 | Ueno et al. | |
| 4,776,974 A | 10/1988 | Stanton et al. | |
| 5,208,257 A | 5/1993 | Kabara | |
| 5,234,703 A | 8/1993 | Guthery | |
| 5,234,719 A | 8/1993 | Richter et al. | |
| 5,330,769 A | 7/1994 | Mckinzie et al. | |
| 5,391,379 A | 2/1995 | Mckinzie et al. | |
| 5,536,008 A | 7/1996 | Clapper, Jr. | |
| 5,573,800 A | 11/1996 | Wilhoit | |
| 6,033,705 A | 3/2000 | Isaacs | |
| 6,063,425 A | 5/2000 | Kross et al. | |
| 6,113,963 A | 9/2000 | Gutzmann et al. | |
| 6,136,769 A | 10/2000 | Asano et al. | |
| 6,183,807 B1 | 2/2001 | Gutzmann et al. | |
| 6,187,348 B1 | 2/2001 | Polster | |
| 6,262,038 B1 | 7/2001 | Pierce et al. | |
| 6,472,358 B1 | 10/2002 | Richter et al. | |
| 6,500,861 B1 | 12/2002 | Wider | |
| 6,509,050 B1 | 1/2003 | Henson et al. | |
| 6,528,101 B1 | 3/2003 | Polster | |
| 6,559,189 B2 | 5/2003 | Baker, Jr. et al. | |
| 6,579,556 B2 | 6/2003 | Kirby et al. | |
| 6,586,026 B1 | 7/2003 | Ramesh et al. | |
| 6,613,364 B2 | 9/2003 | Begg et al. | |
| 6,620,446 B2 | 9/2003 | King et al. | |
| 6,638,978 B1 | 10/2003 | Kabara | |
| 6,767,569 B1 | 7/2004 | Marsden et al. | |
| 6,843,043 B2 | 1/2005 | Hanson et al. | |
| 6,976,347 B2 | 12/2005 | Karman et al. | |
| 7,011,575 B2 | 3/2006 | Smarsh | |
| 7,090,882 B2 | 8/2006 | Koefod et al. | |
| 7,915,207 B2 * | 3/2011 | Herdt et al. | 510/111 |
| 8,080,502 B2 * | 12/2011 | Herdt et al. | 510/111 |
| 2002/0064585 A1 | 5/2002 | Christianson et al. | |
| 2002/0164405 A1 | 11/2002 | Polster | |
| 2002/0192340 A1 | 12/2002 | Swart et al. | |
| 2002/0197366 A1 | 12/2002 | King et al. | |
| 2003/0039632 A1 | 2/2003 | Stiles et al. | |
| 2003/0047087 A1 | 3/2003 | Phebus et al. | |
| 2003/0099745 A1 | 5/2003 | Grinstead et al. | |
| 2003/0228401 A1 | 12/2003 | Newman et al. | |
| 2004/0013694 A1 | 1/2004 | Newman et al. | |
| 2004/0018283 A1 | 1/2004 | Hirschey et al. | |
| 2004/0018284 A1 | 1/2004 | Kuethe et al. | |
| 2004/0033296 A1 | 2/2004 | Yuan et al. | |
| 2004/0043922 A1 | 3/2004 | Naidu | |

(Continued)

FOREIGN PATENT DOCUMENTS

| EP | 0128610 | 12/1984 |
|---|---|---|
| EP | 0750853 | 1/1997 |

(Continued)

OTHER PUBLICATIONS

Ababouch, L., Chaibi, A., Busta, F.F., "Inhibition of Bacterial Spore Growth by Fatty Acids and Their and Their Sodium Salts", Journal of Food Protection, vol. 55, No. 12, Dec. 1992, pp. 980-984, International Association for Food Protection.

Ariyapitipun, Tipayanate, Mustapha, Azlin, Clarke, Andrew D., Survival of *Listeria monocytogenes* on Vacuum-Packaged Raw Beef Treated with Polylactic Acid, Lactic Acid, and Nisin, Journal of Food Protection, vol. 63, No. 1, Jan. 2000, pp. 131-136(6), International Association for Food Protection.

Auburn University, "Evaluation of mechanical tenderized beef and the implications for industry changes." www.reeis.usda.gov/web.crisprojectpages/215255.html, Nov. 11, 2009, 3 pages.

Bedie, G.K., Kain, M.L., Samelis, J., Sofos, J.N., Belk, K.E., Sanga J.A., Smith, G.C., "Evaluation of Antimicrobial Incorporated into the Formulation Against Post-Processing Contamination of *Listeria monocytogenes* on Frankfurters Stored at 4° C. in Vacuum Packages", 2001 Sciences Research Report, the Department of Animal Sciences, Colorado State University, pp. 1-5.

(Continued)

*Primary Examiner* — John Hardee
(74) *Attorney, Agent, or Firm* — Merchant & Gould P.C.

(57) ABSTRACT

The present disclosure relates to methods of treating food products by applying an antimicrobial composition and processing the food product using selected processing methods.

21 Claims, No Drawings

U.S. PATENT DOCUMENTS

| | | |
|---|---|---|
| 2004/0050020 A1 | 3/2004 | Hanson et al. |
| 2004/0058041 A1 | 3/2004 | Greenwald |
| 2004/0105927 A1 | 6/2004 | Karman et al. |
| 2004/0131709 A1 | 7/2004 | Berdahl et al. |
| 2004/0146619 A1 | 7/2004 | Maye |
| 2004/0166216 A1 | 8/2004 | Marsden et al. |
| 2004/0175480 A1 | 9/2004 | Seman et al. |
| 2005/0022468 A1 | 2/2005 | Hanson et al. |
| 2005/0032668 A1 | 2/2005 | Pedersen et al. |
| 2005/0152991 A1 | 7/2005 | Man et al. |
| 2005/0159324 A1 | 7/2005 | Man et al. |
| 2006/0286229 A1 | 12/2006 | Koefod et al. |
| 2007/0020364 A1 | 1/2007 | Bernette et al. |
| 2007/0020365 A1 | 1/2007 | Herdt et al. |
| 2007/0020366 A1 | 1/2007 | Luchansky et al. |
| 2008/0274242 A1 | 11/2008 | Gutzmann et al. |

FOREIGN PATENT DOCUMENTS

| | | |
|---|---|---|
| EP | 0940090 | 9/1999 |
| EP | 1561801 | 8/2005 |
| EP | 1621085 | 2/2006 |
| JP | 06054672 | 3/1994 |
| WO | WO 01/05254 | 1/2001 |
| WO | WO 01/49121 | 7/2001 |
| WO | WO 02/054866 | 7/2002 |
| WO | WO 02/060280 | 8/2002 |
| WO | WO 03/073849 | 9/2003 |
| WO | WO 03/076088 | 9/2003 |
| WO | WO 2004/057984 | 7/2004 |
| WO | WO 2006/023663 | 3/2006 |
| WO | WO 2007/092633 | 8/2007 |

OTHER PUBLICATIONS

Bedie, G.K., Samelis, J., Sofos, J.N., Belk, K.E., Scanga, J.A., Smith, G.C., "Antimicrobials in the Formulation to Control *Listeria monocytogenes* Post processing Contamination on Frankfurters Stored at 4° C. in Vacuum Packages", Journal of Food Protection, vol. 64, No. 12, Dec. 1, 2001, pp. 1949-1955(7), International Association for Food Protection.

Blaszyk, M., Holley, R.A., "Interaction of mololaurin, eugenol and sodium citrate on growth of common meat spoilage and pathogenic organisms", International Journal of Food Microbiology 39 (1998) pp. 175-183.

C.-M. Chen, J.G. Sebranek, J.S. Dickson, A.F. Mendonca, "Combining Pediocin with Post packaging Irradiation for Control of *Listeria monocytogenes* on Frankfurters", Journal of Food Protection, vol. 67, No. 9, Sep. 1, 2004, pp. 1866-1875(10), International Association for Food Protection.

Calicioglu, M., Kaspar, C.W., Buege, D.R., Luchansky, J.P., Effectiveness of Spraying with Tween 20 and Lactic Acid in Decontaminating Inoculated *Escherichia coli* O157:H7 and Indigenous *Escherchia coli* biotype I on Beef, Journal of Food Protection, vol. 65, No. 1, Jan. 1, 2002, pp. 26-32(7), International Association for Food Protection.

Chen, C., Sebranek, J.G., Dickson, J.S., Mendonca, A.F., "Use of Pediocin (Alta™ 2341) for Control of *Listeria monocytogenes* on Frankfurters", Journal of Muscle Foods, vol. 15, pp. 35-56.

Chen, Sebranek, Dickson & Mendonca, "Combining Pediocin (ALTA 2341) with Post packaging Thermal Pasteurization for Control of *Listeria monocytogenes* on Frankfurters", Journal of Food Protection, vol. 67, No. 9, Sep. 1, 2004, pp. 1855-1865, 11 pgs.

Davies, E. Alison, Milne, Catherine F., Bevis, Helen E., Potter, Richard W., Harris, Jo M., Williams Graham C., Thomas, Linda V., Delves-Broughton, Joss, "Effective Use of Nisin to Control Lactic Acid Bacterial Spoilage in Vacuum-Packed Bologna-type Sausage", Journal of Food Protection, vol. 62, No. 9, Sep. 1999, pp. 1004-1010(7), International Association for Food Protection.

Eutech Instruments "Measuring the Ph value of meat" 1997 http://www.eutechinst.com/tech-tips35.htm pp. 1-3.

Farid, M., Bal'A, A., Marshall, D.L., "Organic Acid Dipping of Catfish Fillets: Effect on Color, Microbial Load, and *Listeria monocytogenes*", Journal of Food Protection, vol. 61, No. 11, 1998, pp. 1470-1474, International Association for Food Protection.

Friedman, M., Henika, P.R., Mandrell, R.E., "Bactericidal Activities of Plant Essential Oils and Some of Their Isolated Constituents against *Campylobacter jenuni, Escherichia coli, Listeria monocytogenes*, and *Salmonella enterica*", Journal of Food Protection, vol. 65, No. 10, Oct. 2002, pp. 1545-1560(16), International Association for Food Protection.

Friedman, M., Henika, P.R., Mandrell, R.E., "Antibacterial Activities of Phenolic Benzaldehydes and Benzoic Acids Against *Camplobacter jenuni, Escherichia coli, Listeria monocytogenes*, and *Salmonella enterica*", Journal of Food Protection, vol. 66, No. 10, Oct. 1, 2003, pp. 1811-1821 (11), International Association for Food Protection.

Gande, N., Muriana, P., "Prepackaging Surface Pasteurization of Ready-to-East Meats with a Radiant Heat Oven for Reduction of *Listeria monocytogenes*", Journal of Food Protection, vol. 66, No. 9, Sep. 1, 2003, pp. 1623-1630(8), International Association for Food Protection.

Glass, K.A., Granberg, D.A., Smith, A.L., McNamara, A.M., Hardin, M., Mattias, J., Landwig, K., Johnson, E.A., "Inhibition of *Listeria monocytogenes* by Sodium Diacetate and Sodium Lactate on Wieners and Cooked Bratwurst", Journal of Food Protection, vol. 65, No. 1, Jan. 2002, pp. 116-123(8), International Association for Food Protection.

Gombas, D., Chen, Y., Clavero, R., and Scott, V., "Survey of *Listeria monocytogenes* in Ready-to-East Foods", National Food Journal of Food Protection, vol. 66, No. 4, 2003, pp. 559-569, 11 pgs.

Heller, et al., "Decontamination of beef subprimal cuts intended for blade tenderization or moisture enhancement.", Journal of Food Protection, vol. 70, No. 5 (2007), pp. 1174-1180.

Islam, M., Chen, J., Doyle, M.P., Chinnan, M., "Control of *Listeria monocytogenes* on Turkey Frankfurters by Generally-Recognized-as-Safe Preservatives", Journal of Food Protection, vol. 65, No. 9, Sep. 1, 2002, pp. 1411-1416(6), International Association for Food Protection.

Islam, M., Chen, J., Doyle, M.P., Chinnan, M., "Effect of Selected Generally Recognized as Safe Preservative Sprays on Growth of *Listeria monocytogenes* on Chicken Luncheon Meat", Journal of Food Protection, vol. 65, No. 5, May 1, 2002, pp. 794-798(5), International Association for Food Protection.

J.B. Luchansky, J.E. Call, B. Hristova, L. Rumery, L. Yoder and A. Oser, "Viability of *Listeria monocytogenes* on commercially-prepared hams surface treated with acidic calcium sulfate and lauric arginate and stored at 4° C.", Meat Science, vol. 71, Issue 1, Sep. 2005, pp. 92-99.

Juneja, V.K., et al., "Control of *Clostridium perfringens* in a model roast beef by salts of organic acids during chilling", Journal of Food Safety, vol. 24, No. 2, 2004, pp. 95-108, XP008071343, ISSN: 0149-6085.

Luchansky, J.B., "Viability of *Listeria monocytogenes* on Commercially-prepared Hams Surface Treated with Acidic Calcium Sulfate and Lauric Arginate and Stored at 4° C.", Meat Science 71 (2005), pp. 92-99.

McCormick, K.E., et all, "In-package pasteurization combined with biocide-impregnated films to inhibit *Listeria monocytogenes* and *Salmonella typhimurium* in turkey bologna." Journal of Food Science, vol. 70, No. 1, Jan. 2005, pp. M52-M-57, XP008071365.

McEntire, J.C., Montville, T.J., Chikindas, M.L., "Synergy between Nisin and Select Lactates against *Listeria monocytogenes* is Due to the Metal Cations", Journal of Food Protection, vol. 66, No. 9, Sep. 1, 2003, pp. 1631-1636(6), International Association for Food Protection.

Muriana, P.M., Qumby, W., Davidson, C.A., Grooms, J., "Postpackage Pasteurization of Ready-to-Eat Deli Meets by Submersion Heating for Reduction of *Listeria monocytogenes*", Journal of Food Protection, vol. 65, No. 6, Jun. 1, 2002, pp. 963-969(7), International Association for Food Protection.

Muriana, P., Escoubas, J.R., "Pre-and Post-package Pasteurization of RTE Meats for Reduction of *Listeria monocytogenes*", Oklahoma State University, AMI Foundation, Feb. 2004, 4 pages.

Murphy, R.Y., Berrang, M.E., Thermal Lethality of *Salmonella* Senftenberg and *Listeria* innocua on Fully Cooked and Vacuum Packaged Chicken Breast Strips during Hot Water Pasteurization, Journal of Food Protection, vol. 65, No. 10, Oct. 1, 2002, pp. 1561-1564(4), International Association for Food Protection.

Murphy, R.Y., Duncan, L.K., Driscoll, K.H., Beard, B.L., Berrang, M.B., Marcy, J.A., "Determination of Thermal Lethality of *Listeria monocytogenes* in Fully Cooked Chicken Breast Fillets and Strips during Postcook In-Package Pasteurization", Journal of Food Protection, vol. 66, No. 4, Apr. 1, 2003, pp. 578-583(6), International Association for Food Protection.

Murphy, R.Y., Duncan, L.K., Driscoll, K.H., Marcy, J.A., Beard, B.L., "Thermal Inactivation of *Listeria monocytogenes* on Ready-to-East Turkey Breast Meat Products during Postcook In-Package Pasteurization with Hot Water", Source: Journal of Food Protection, vol. 66, No. 9, Sep. 1, 2003, pp. 1618-1622(5), International Association for Food Protection.

Nykanen, A., Weckman, K., Lapvetelianen, A., "Synergistic inhibition of *Listeria monocytogenes* on cold-smoked rainbow trout by nisin and sodium lactate", International Journal of Food Microbiology, vol. 61 (2000), pp. 63-72.

Porto, A.C.S., Call, J.E., Luchansky, J.B., "Effect of Reheating on Viability of a Five-Strain Mixture of *Listeria monocytogenes* in Vacuum-Sealed Packages of Frankfurters following Refrigerated or Frozen Storage", Journal of Food Protection, vol. 67, No. 1, Jan. 1, 2004, pp. 71-76(6), International Association for Food Protection.

Samelis, J., et al., "Control of *Listeria monocytogenes* with combined antimicrobials after post process contamination and extended storage of frankfurters at 4 degree C. in vacuum packages." Journal of Food Protection, vol. 65, No. 2, 2002, pp. 299-307, XP008071340.

Samelis, J., Sofos, J.N., Kain, M.L., Scanga, J.A., Belk, K.E., Smith, G.C., Organic Acids and Their Salts as Dipping Solutions to Control *Listeria monocytogenes* Inoculated following Processing of Sliced Pork Bologna Stored at 4° C. in Vacuum Packages, Journal of Food Protection, vol. 64, No. 11, Nov. 1, 2001, pp. 1722-1729(8), International Association for Food Protection.

Vermeiren, L., Devlieghere, F., Debevere J., "Effectiveness of some recent antimicrobial packaging concepts", Food Additives and Contaminants, 2002, vol. 19, Supplement, 163-171.

Yen, L.C., Sofos, J.N., Schmidt, G.R., "Effect of Meat Curing Ingredients on Thermal Destruction of *Listeria monocytogenes* in Ground Pork", Journal of Food Protection, vol. 54, pp. 408-412, International Association for Food Protection.

Zeitoun, A.A.M., Debevere, J.M., "Inhibition, survival and growth of *Listeria monocytogenes* on poultry as influenced by buffered lacic acid treatment and modified atmosphere packaging", International Journal of Food Microbiology, vol. 14 (1991), pp. 161-170.

\* cited by examiner

ANTIMICROBIAL COMPOSITIONS FOR USE ON FOOD PRODUCTS

CROSS REFERENCE TO RELATED APPLICATION

This application is a continuation-in-part of U.S. Application entitled "ANTIMICROBIAL COMPOSITIONS FOR USE ON FOOD PRODUCTS", Ser. No. 11/459,069, filed on Jul. 21, 2006, which claims priority under 35 U.S.C. §119(e) to U.S. Provisional Application entitled "ANTIMICROBIAL COMPOSITIONS FOR USE ON FOOD PRODUCTS", Ser. No. 60/702,243, filed on Jul. 25, 2005, which is incorporated herein by reference in its entirety. This application is also a continuation-in-part of U.S. Application entitled "ANTIMICROBIAL COMPOSITIONS AND METHODS FOR TREATING PACKAGED FOOD PRODUCTS", Ser. No. 11/779,596, filed Jul. 18, 2007, which claims priority under 35 U.S.C. §119(e) to U.S. Provisional Application entitled "ANTIMICROBIAL COMPOSITIONS AND METHODS FOR TREATING PACKAGED FOOD PRODUCTS", Ser. No. 60/807,956, filed on Jul. 21, 2006, which is incorporated herein by reference in its entirety. This application is related to subject matter disclosed in U.S. patent application for "ANTIMICROBIAL COMPOSITIONS AND METHODS FOR TREATING PACKAGED FOOD PRODUCTS", Ser. No. 11/459,067, filed on Jul. 21, 2006, the subject matter of which is incorporated in this application by reference.

FIELD

The present disclosure relates to methods of using antimicrobial compositions in food processing.

BACKGROUND

During the processing, preparation and packaging of food products, the food product may encounter microorganisms which may make the food unsuitable for consumption. The microorganisms may come from the food itself, the food contact surfaces, and/or the surrounding environment. The microorganisms can range from pathogenic microorganisms (e.g., *Listeria monocytogenes*, enterohemorrhagic *Escherichia coli*, *Salmonella* and the like) to spoilage organisms that can affect the taste, color, and/or smell of the final food product (e.g., *Pseudomonas*, *Acinetobacter*, *Moraxella*, *Alcaligenes*, *Flavobacterium*, *Erwinia*, and the like). Microorganisms can affect a wide variety of food products including meat, poultry, fish and shellfish, cheese, fruits and vegetables, and pre-prepared foods. At certain levels, the presence of microorganisms on a food product may cause everything from a consumer's perception of a lower quality product, to regulatory investigations and sanctions, to foodbourne illness and death.

Food processors use a variety of methods during processing to control and/or reduce the presence of microorganisms on food products. These methods include everything from cleaning and sanitizing the food processing plant environment, applying or incorporating antimicrobials to or in the food product, irradiating the food product, applying heat, and others. Applying or incorporating an antimicrobial composition to or in the food product is a preferred way of controlling microorganisms. However, it is difficult to formulate a composition that is effective at reducing microorganisms using ingredients that are acceptable for direct food contact according to government regulations. Further, it is difficult to formulate a composition that can be applied directly to a food product without adversely affecting the color, taste, or smell of the food product. Finally, once a food product has been treated with an antimicrobial composition or process to control the presence of microorganisms on the food product, the opportunity exists for the food product to become re-contaminated during further processing.

Food safety agencies have issued guidelines for processing food that may have exposure to surfaces contaminated with microorganisms including *Listeria monocytogenes*, *Salmonella*, and *E. coli* O157-H7. See e.g., Food Safety Inspection Service (FSIS) final rule for the control of *Listeria monocytogenes* in ready-to-eat (RTE) meat and poultry products, 9 CFR 430.

The FSIS guidelines on *Listeria* provide three alternatives for controlling the presence of *Listeria* on a RTE product. Under Alternative 1, an establishment applies a post-lethality treatment to the RTE product and an antimicrobial agent or process to control or suppress the growth of *L. monocytogenes* during the shelf life of the RTE product. Under Alternative 2, an establishment applies either a post-lethality treatment or an antimicrobial agent or process to suppress the growth of *L. monocytogenes*. Under Alternative 3, an establishment does not apply any post-lethality treatment or antimicrobial agent or process. Instead, it relies on its sanitation program to prevent the presence of *L. monocytogenes*. RTE products produced under Alternative 2 have greater control over potential *Listeria* contamination than RTE products produced under Alternative 3. Similarly, RTE products produced under Alternative 1 have greater control over *Listeria* contamination than those produced under Alternative 2. Besides providing better microbial control for RTE products, facilities operating under Alternative 1 are subject to less agency intervention (e.g., inspections, recordkeeping, etc.) than an Alternative 2 or Alternative 3 facility.

*Salmonella* is known to be prevalent on raw poultry, beef, and pork. Further, *Salmonella* has a high incidence of causing foodbourne illness, and sometimes severe foodbourne illness. Establishments must employ processes validated to achieve specific levels of reduction of *Salmonella* organisms throughout their finished RTE meat and poultry product (6.5 $\log_{10}$ throughout finished meat products and 7 $\log_{10}$ throughout finished poultry products).

*E. coli* O157:H7 has been linked to foodbourne illness outbreaks. The FSIS has additional lethality performance standards for all fermented RTE products that include any amount of beef, except thermally-processed, commercially sterile products. Establishments must employ processes validated to achieve a 5.0 $\log_{10}$ reduction of *E. coli* O157:H7 throughout fermented products containing beef.

It is against this background that the present disclosure has been made.

SUMMARY

Surprisingly, it has been discovered that microorganisms on food products can be reduced by applying antimicrobial compositions to the food product during processing.

In one embodiment, the disclosure relates to a method of treating a meat or poultry product with an antimicrobial composition. In the method, an antimicrobial composition is applied to the surface of the meat or poultry product, and the meat or poultry product is processed using a chemical or mechanical tenderizer.

In another embodiment, the disclosure relates to a method of treating a meat or poultry product with an antimicrobial composition. In the method, an antimicrobial composition is applied to a processing tool such as a pounder, a needle tenderizer, an injector, a grinder, or a combination thereof, and the processing tool is used to process the meat or poultry product and apply the antimicrobial product to the surface of the meat or poultry product.

In yet another embodiment, the disclosure relates to a method of treating a meat or poultry product with an antimicrobial composition. In the method, an antimicrobial composition is applied to a meat or poultry product simultaneously with a chemical tenderizer.

These and other embodiments will be apparent to those of skill in the art and others in view of the following detailed description of some embodiments. It should be understood, however, that this summary, and the detailed description illustrate only some examples of various embodiments, and are not intended to be limiting to the invention as claimed.

DETAILED DESCRIPTION

The present disclosure relates to methods of treating meat or poultry products with an antimicrobial compositions, and specifically antimicrobial compositions that are useful at sanitizing food products.

It is understood that the various embodiments of the present disclosure may be combined to create a variety of unique embodiments and still remain within the scope of the present disclosure. Further, it is understood that the examples described herein may be used in conjunction with any of the embodiments described, unless stated otherwise.

Antimicrobial Composition

The method includes the application of an antimicrobial composition to the food product. The antimicrobial composition comprises at least one active antimicrobial ingredient. Additionally, the antimicrobial composition may also contain additional functional ingredients that aid in the function of the active antimicrobial ingredient, or impart a desired function or benefit.

There are a variety of active antimicrobial agents that may be used. Some non-limiting examples of antimicrobial agents that may be used include fatty acids, $C_1$-$C_{12}$ dicarboxylic acids, percarboxylic acids, halogen compositions or interhalogens thereof, a halogen donor composition, chlorine dioxide, acidified sodium chlorite, ozone, a quaternary ammonium compound, an acid-anionic organic sulfonate or sulfate, a protonated carboxylic acid, or mixtures thereof. Some non-limiting examples of fatty acids include $C_6$ to $C_{22}$ fatty acids. Fatty acids may be saturated in which all of the alkyl chain carbon atoms are connected by a single bond. Fatty acids can also be unsaturated where there are one or more double bonds between the carbon atoms. Non-limiting examples of saturated fatty acids include hexanoic ($C_6$), octanoic ($C_8$), nonanoic ($C_9$), decanoic ($C_{10}$), lauric ($C_{12}$), myristic ($C_{14}$), palmitic ($C_{16}$), stearic ($C_{18}$), arachidic ($C_{20}$), behenic ($C_{22}$) and the like. Non-limiting examples of unsaturated fatty acids include palmitoleic ($C_{16:1}$), oleic ($C_{18:1}$), linoleic ($C_{18:2}$), linolenic ($C_{18:3}$), arachidonic ($C_{20:1}$) and the like. Octanoic acid is a preferred fatty acid. Some non-limiting examples of percarboxylic acids include: $C_1$-$C_{10}$ percarboxylic acids, diperoxyglutaric acid, diperoxyadipic acid, diperoxysuccinic acid, diperoxysuberic acid, diperoxymalonic acid, peroxylactic acid, peroxyglycolic acid, peroxyoxalic acid, peroxypyruvic acid, and mixtures thereof. An exemplary percarboxylic acid antimicrobial product is that sold under the name INSPEXX™, commercially available from Ecolab Inc. (St. Paul, Minn.). Some non-limiting examples of halogen compounds and interhalogens thereof include: $Cl_2$, $Br_2$, $I_2$, ICl, IBr, ClBr, $ICl_2^-$, $IBr_2^-$, and mixtures thereof. Non-limiting examples of halogen donor compositions include: HOCl, HOI, HOBr, and the salts thereof; N-iodo, N-bromo, or N-chloro compounds; and N-bromosuccinamide, chloroisocyanuric acid, or 2-N-sodium-N-chloro-p-toluenesulfonamide. A non-limiting example of chlorine dioxide compositions includes chlorine dioxide generated from conventional chemical generators such as those sold by Prominent™ or preferably generated electrochemically using Halox™ generators. Some non-limiting examples of acidified sodium chlorite include the composition sold under the tradename SANOVA™, and commercially available from Ecolab Inc., (St. Paul, Minn.). A non-limiting example of ozone includes ozone generated electrochemically via high voltage discharge in oxygen. Non-limiting examples of quaternary ammonium compounds include: didecyldimethylammonium chloride, dioctyldimethylammonium chloride, octyldecyldimethylammonium chloride, alkyldimethylbenzylammonium chloride, and mixtures thereof. Non-limiting examples of acid-anionic organic sulfonates and sulfates include: acidic solutions of linear benzylsulfonic acid and sulfonated oleic acid. Non-limiting examples of protonated carboxylic acids include solutions with a pH less than 5 of one or more $C_1$-$C_{20}$ carboxylic acids. See U.S. Pat. Nos. 4,051,058, 4,051,059, 5,200,189, 5,200,198, 5,489,434, 5,718,910, 5,314,687, 5,437,868 for further discussion on peracid chemistry and the formation of an antimicrobial agent formulation. These patents are incorporated herein by reference in their entirety.

The antimicrobial agent may include one active antimicrobial agent or a combination of more than one active antimicrobial agent. The active antimicrobial agent is preferably a GRAS (generally recognized as safe) or food grade composition. Some non-limiting examples of preferred active antimicrobial agents include fatty acids, acidified sodium chlorite, and peroxyacids such as peroxyacetic acid and peroxyoctanoic acid.

When applying the antimicrobial composition to the food product, the antimicrobial composition can contain from about 0.001 wt. % to about 10 wt. % of the active antimicrobial agent, from about 0.005 wt. % to about 5 wt. % of the active antimicrobial agent, and from about 0.01 wt. % to about 2 wt. % of the active antimicrobial agent. It is understood that different antimicrobial agents have different activities. A person skilled in the art will be able to select the antimicrobial composition and concentration to achieve the desired result.

As previously discussed, the antimicrobial composition may include additional functional ingredients in addition to the active antimicrobial agent. Examples of additional functional ingredients that may be included along with the active antimicrobial agent include oxidizers, carriers, chelating agents, hydrotropes, thickening and/or gelling agents, foaming agents, film-forming agents, surfactants, coupling agents, acidulants, buffering agents, pH adjusting agents, potentiators preservative, flavoring aids, fragrance, dye, and the like.

A specific example of a GRAS antimicrobial composition is a octanoic acid-based antimicrobial compositions such as that described below.

Octanoic Acid

The exemplary octanoic acid-based antimicrobial composition includes a $C_6$ to $C_{22}$ fatty acid and in particular octanoic acid as the active antimicrobial agent. Not only does octanoic acid provide the antimicrobial activity, but it is also considered to be "food grade" by the Food Chemicals Codex and a "food additive" by the United States Food and Drug Administration. This combination of antimicrobial activity with direct food application makes octanoic acid particularly useful for applications on food surfaces.

Octanoic acid has the following chemical structure:

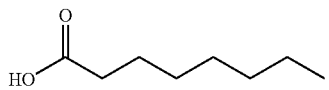

The octanoic acid may be octanoic acid or a derivative thereof. For example, esters of octanoic acid, or salts of octanoic acid may also be used as the active antimicrobial agent. Common ester derivatives of carboxylic acids are those where the hydroxy group is replaced by an alkoxy group which may comprise any number of different alkyl moieties which do not impede the efficacy of the octaonic acid compound.

The principle types of esters result from reaction with monohydric alcohols, polyhydric alcohols, and ethylene or propylene oxide. The most common monohydric alcohols used are the simple alkyl alcohols such as methyl, ethyl, propyl, butyl, isopropyl, and the like. The most common polyhydric alcohols include polyethylene glycol, glycerol, sorbitol, and certain carbohydrates such as sucrose.

Octanoic acid may take the form of a salt by reaction with an alkaline substance most commonly from oxides, hydroxides, or carbonates of monovalent and divalent metals in Periodic Groups IA and IIA but also with basic positive complexes such as the ammonium radical and organic amine moieties.

Accordingly, the octanoic acid of the disclosure may comprise any number of acid salts, esters, and the like. Preferably, the compound used is octanoic acid, an octanoic acid salt, an octanoic acid ester, or mixtures thereof.

In some embodiments, the composition can consist essentially of octanoic acid, acidulant, and coupling agent where the composition does not include any additional antimicrobial agents. In some embodiments, the composition can consist of octanoic acid, acidulant, and coupling agent.

When the composition is formulated as a concentrate composition, the octanoic acid may be present in a concentration ranging generally from about 1 wt. % to about 50 wt. %, from about 2 wt. % to about 25 wt. %, and from about 3 wt. % to about 15 wt. %. When the composition is formulated as a ready-to-use composition, the octanoic acid may be present in a concentration ranging generally from about 0.01 wt. % to about 15 wt. %, from about 0.05 wt. % to about 10 wt. %, and from about 0.1 wt. % to about 5 wt. %. When the composition is formulated as a ready-to-use composition, the octanoic acid may be present in a concentration ranging from about 100 ppm to about 15,000 ppm, from about 500 ppm to about 12,000 ppm, and from about 1000 ppm to about 10,000 ppm.

Acidulant

The exemplary octanoic acid-based antimicrobial composition includes one or more acidulants for controlling the pH of the composition. The acidulants are preferably considered GRAS or food additive raw materials. Some non-limiting examples of suitable GRAS or food additive acidulants include lactic acid, phosphoric acid, sulfuric acid, adipic acid, tartaric acid, succinic acid, acetic acid, propionic acid, citric acid, malic acid, sodium acid sulfate, and mixtures thereof. The acidulant is preferably phosphoric acid or citric acid.

The exact amount of the acidulant will depend on the selection of the acidulant and the strength of the acidulant. The acidulant is preferably included in an amount to provide a desired pH. The pH of the ready-to-use composition is preferably from about 1.0 to about 5.6, from about 1.5 to about 4.5, and from about 2.0 to about 4.0. A person of ordinary skill in the art will be able to determine the weight percentage of acidulant, in equilibrium, necessary to achieve the desired pH. However, exemplary weight percent ranges for the acidulant at equilibrium when the composition is formulated as a concentrate composition range generally from about 1 wt. % to about 50 wt. %, from about 1.5 wt. % to about 25 wt. %, and from about 2 wt. % to about 15 wt. %. When the composition is formulated as a ready-to-use composition, the acidulant may be present at equilibrium in a concentration ranging generally from about 0.1 wt. % to about 15 wt. %, from about 0.2 wt. % to about 10 wt. %, and from about 0.4 wt. % to about 5 wt. %.

Buffers

The exemplary octanoic acid-based antimicrobial composition optionally includes one or more buffers. The buffer is preferably the conjugate base of the acidulant used in the composition. Further, the buffer is preferably considered to be a GRAS or food additive raw material. The buffer can be added directly to the composition in the form of the salt of the acidulant or formed by adding a neutralizing base to the acidulant. For example, if the buffer is created in the composition then a neutralizing base should be added to the acidulant to form the corresponding buffering salt. The neutralizing base is preferably considered GRAS or food additive. Some non-limiting examples of suitable neutralizing bases include sodium hydroxide, potassium hydroxide, silicates, trisodium-phosphates and the like.

The buffer salts are preferably GRAS or food additive. Some non-limiting examples of suitable buffers include citric acid combined with sodium or potassium citrate, or phosphoric acid combined with monosodium phosphate, however, a person skilled in the art will be able to select the corresponding salt of the desired acidulant.

The buffer is preferably citric acid combined with sodium or potassium citrate.

The exact amount of the buffer in the composition will depend on the strength and amount of the acidulant and a person of ordinary skill in the art will be able to determine the exact weight percent of the buffer at equilibrium. However, when the composition is formulated as a concentrate composition, the buffer may be present in a concentration ranging generally from about 1 wt. % to about 50 wt. %, from about 1.5 wt. % to about 25 wt. %, and from about 2 wt. % to about 15 wt. %. When the composition is formulated as a ready-to-use composition, the buffer may be present in a concentration ranging generally from about 0.1 wt. % to about 10.0 wt. %, from about 0.2 wt. % to about 5.0 wt. %, and from about 0.4 wt. % to about 3.0 wt. %. The buffer is preferably included in the composition in an amount effective to maintain the pH of the ready-to-use composition from about 1.0 to about 5.6, from about 1.5 to about 4.5, and from about 2.0 to about 4.0.

Coupling Agents

The exemplary octanoic acid-based antimicrobial composition includes one or more coupling agents for maintaining the raw materials of the composition in solution. The coupling agent is preferably a GRAS or food additive raw material. Some non-limiting examples of suitable coupling agents include alkyl polyglucosides, such as Glucopon 215 UP (Cognis), Glucopon 325 (Cognis), propylene glycol esters, glycerol esters, polyoxyethylene glycerol esters, polyglycerol esters, sorbitan esters, polyoxyethylene sorbitan esters, polyoxyethylene-polyoxypropylene polymers, sulfonates, dioctyl sodium succinate, stearoyl lactylate, and complex esters such as acetylated, lactylated, citrated, succinhylated, or diacetyl tartarated glycerides. The coupling agent is preferably a sorbitan ester such as polyoxyethylene (20) sorbitan monooleate, commercially available as Polysorbate 80, polyoxyethylene (20) sorbitan monostearate, commercially available as Polysorbate 60, and polyoxyethylene (20) sorbitan monolaurate, commercially available as Polysorbate 20.

When the composition is formulated as a concentrate composition, the coupling agent may be present in a concentration ranging generally from about 1 wt. % to about 50 wt. %, from about 2 wt. % to about 25 wt. %, and from about 3 wt. % to about 15 wt. %. When the composition is formulated as a ready-to-use composition, the coupling agent may be present in a concentration ranging generally from about 0.02 wt. % to about 15 wt. %, from about 0.05 wt. % to about 10 wt. %, and from about 0.1 wt. % to about 5 wt. %.

Long Chain Fatty Acids

The exemplary octanoic acid-based antimicrobial composition may optionally include a long chain fatty acid, and specifically a $C_6$ to $C_{22}$ fatty acid. Fatty acids are comprised of alkyl groups with 6 to 22 carbon atoms with a terminal carboxylic group (—COOH). Fatty acids may be saturated in which all of the alkyl chain carbon atoms are connected by a single bond. Fatty acids can also be unsaturated where there are one or more double bonds between the carbon atoms. Non-limiting examples of saturated fatty acids include hexanoic ($C_6$), octanoic ($C_8$), nonanoic ($C_9$), decanoic ($C_{10}$), lauric ($C_{12}$), myristic ($C_{14}$), palmitic ($C_{16}$), stearic ($C_{18}$), arachidic ($C_{20}$), behenic ($C_{22}$) and the like. Non-limiting examples of unsaturated fatty acids include palmitoleic ($C_{16:1}$), oleic ($C_{18:1}$), linoleic ($C_{18:2}$), linolenic ($C_{18:3}$), arachidonic ($C_{20:1}$) and the like.

Oxidizers

The exemplary octanoic acid-based antimicrobial composition may optionally include an oxidizer. Some non-limiting examples of oxidizers include peroxygen compounds such as organic and inorganic peroxides, peracids, peresters, and mixtures thereof. Non-limiting examples of inorganic peroxides include: hydrogen peroxide, its salts, and other inorganic acids or salts of percarbonates, persulfates, and perborates. Non-limiting examples of organic peroxides include: benzoyl peroxide, tert-butyl benzoyl peroxide, and other alkyl and/or aryl peroxides. Non-limiting examples of peracids include: performic acid, peracetic acid, perlactic acid, perglycolic acid, chloroperbenzoic acid, perheptanoic acid, peroctanoic acid, perdecanoic acid, percitric acid, perbenzoic acid. Non-limiting examples of perester peracids include: monoester peracids derived from diacids or mono-ester diacids or diesters (e.g., such as adipic, succinic, glutaric, sebacic, or malonic acids/esters and mixtures thereof).

It is also possible to utilize oxidants capable of generating active oxidizing or oxygen species; including oxygen, ozone, chlorine dioxide, and mixtures thereof. The preferred oxidants are peroxygen compounds including, hydrogen peroxide and inorganic peroxides.

Carriers

The exemplary octanoic acid-based antimicrobial composition may optionally include a carrier or solvent. The carrier may be water or other solvent such as an alcohol or polyol. Low molecular weight primary or secondary alcohols exemplified by methanol, ethanol, propanol, and isopropanol are suitable. Monohydric alcohols are preferred for solubilizing surfactants, but polyols such as those containing from about 2 to about 6 carbon atoms and from about 2 to about 6 hydroxy groups (e.g. propylene glycol, ethylene glycol, glycerine, and 1,2-propanediol) can also be used.

Chelating Agents

The exemplary octanoic acid-based antimicrobial composition may optionally contains a polyvalent metal complexing or chelating agent that aids in reducing the harmful effects of hardness components and service water and improves product stability. The chelating agent or sequestering agent can effectively complex and remove such ions from inappropriate interaction with active ingredients thus increasing sanitizing agent performance.

Both organic and inorganic chelating agents may be used. Inorganic chelating agents include such compounds as sodium tripolyphosphate and other higher linear and cyclic polyphosphate species. Organic chelating agents include both polymeric and small molecule chelating agents. Polymeric chelating agents commonly comprise polyanionic compositions such as polyacrylic acid compounds. Amino phosphates and phosphonates are also suitable for use as chelating agents in the compositions of the disclosure and include ethylene diamine (tetramethylene phosphonates), nitrilotrismethylene phosphates, diethylenetriamine (pentamethylene phosphonates). These amino phosphonates commonly contain alkyl or alkaline groups with less than 8 carbon atoms.

Preferred chelating agents include improved food additive chelating agents such as disodium salts of ethylene diamine tetraacetic acid or the well known phosphonates sold in the form of DEQUEST® materials, for example, 1-hydroxyethylidene-1,1-diphosphonic acid, etc. The phosphonic acid may also comprise a low molecular weight phosphonopolycarboxylic acid such as one having about 24 carboxylic acid moieties and about 1-3 phosphonic acid groups.

The above-mentioned phosphonic acids can also be used in the form of water soluble acid salts, particularly the alkali metal salts, such as sodium or potassium; the ammonium salts or the alkylol amine salts where the alkylol has 2 to 3 carbon atoms, such as mono-, di-, or triethanolamine salts. If desired, mixtures of the individual phosphonic acids or their acid salts can also be used.

Thickening Agents and Gelling Agents

The exemplary octanoic acid-based antimicrobial composition may optionally include a thickening agent or a gelling agent. Useful thickeners do not leave contaminating residue on the surface of application, i.e., constituents which are incompatible with food or other sensitive products in contact areas.

Generally, useful thickeners include natural gums such as xanthan gum. Also useful are cellulosic polymers, such as carboxymethyl cellulose. Generally, the concentration of thickener will be dictated by the desired viscosity within the final composition.

Foaming Agents

The exemplary octanoic acid-based antimicrobial composition may optionally include a foaming agent or foaming surfactant. Foaming surfactants can be nonionic, anionic or cationic in nature. Examples of useful surfactant types include, but are not limited to the following: alcohol ethoxylates, alcohol ethoxylate carboxylate, amine oxides, alkyl sulfates, alkyl ether sulfate, sulfonates, quaternary ammonium compounds, alkyl sarcosines, betaines and alkyl amides.

Film-Forming Agents

The exemplary octanoic acid-based antimicrobial composition may also contain one or more rheology modifiers, to enhance viscosity, or thicken and cause the aqueous treatment to cling to the surface being treated. Clinging enables the composition to remain in contact with the transient and resident pathogenic bacteria for longer periods of time, thereby promoting microbiological efficacy and resisting waste because of excessive dripping. The rheology modifier may be a film former or may act cooperatively with a film forming agent to form a barrier that provides additional protection.

Preferred rheology modifiers include colloidal aluminum silicate, colloidal clays, polyvinyl pyrrolidone, polyvinyl acetate, polyvinyl alcohol, polyalkylene oxides, polyacrylamides, or mixtures thereof.

Water soluble or water dispersible rheology modifiers that are useful can be classified as inorganic or organic. The organic thickeners can further be divided into natural synthetic polymers with the latter still further subdivided into synthetic natural-based synthetic petroleum-based.

Organic thickeners are generally compounds such as colloidal magnesium aluminum silicate (Veegum), colloidal clays (Bentonites), or silicas (Cab-O—Sils) which have been fumed to create particles with large surface size ratios.

Natural hydrogel thickeners of use are primarily vegetable derived exudates. For example, tragacanth, karaya, and acacia gums; and extractives such as caragheenan, locust bean gum, guar gum and pectin; or, pure culture fermentation products such as xanthan gum are all potentially useful. Chemically, all of these materials are salts of complex anionic polysaccharides. Synthetic natural-based thickeners having application are cellulosic derivatives wherein the free hydroxyl groups on the linear anhydro-glucose polymers have etherified or esterified to give a family of substances which dissolve in water and give viscous solutions. This group of materials includes the alkyl and hydroxyalkylcelluloses, specifically methylcellulose, hydroxyethylmethylcellulose, hydroxypropylmethylcellulose, hydroxybutylmethylcellulose, hydroxyethylcellulose, ethylhydroxyethylcellulose, hydroxypropylcellulose, and carboxymethylcellulose. Synthetic petroleum-based water soluble polymers are prepared by direct polymerization of suitable monomers of which polyvinylpyrrolidone, polyvinylmethylether, polyacrylic acid and polymethacrylic acid, polyacrylamide, polyethylene oxide, and polyethyleneimine are representative.

Surfactants

The exemplary octanoic acid-based antimicrobial composition may optionally include a surfactant to help with detergency, surface wetting, and antimicrobial performance. Suitable surfactants include nonionic surfactants, anionic surfactants, cationic surfactants, amphoteric surfactants, amine oxides, and the like.

Suitable anionic surfactants include n-octanesulfonate, available as NAS 8D from Ecolab Inc., n-octyl dimethylamine oxide, n-decyl dimethyl amine oxide, cocoa dimethylamine oxide, and the commonly available aromatic sulfonates such as the alkyl benzene sulfonates (e.g. dodecylbenzene sulfonate, cumene sulfonate, xylene sulfonates) or naphthalene sulfonates. Most preferred anionic surfactants include $C_6$-$C_{24}$ alkylbenzene sulfonates, $C_6$-$C_{24}$ olefin sulfonates, $C_6$-$C_{24}$ paraffin sulfonates, cumene sulfonate, xylene sulfonate, $C_6$-$C_{24}$ alkyl naphthalene sulfonates, $C_6$-$C_{24}$ alkyl or dialkyl diphenyl ether sulfonates or disulfonates, $C_4$-$C_{24}$ mono or dialkyl sulfosuccinates, sulfonated or sulfated fatty acids, $C_6$-$C_{24}$ alcohol sulfates (preferably $C_6$-$C_{12}$ alcohol sulfates), $C_6$-$C_{24}$ alcohol ether sulfates having 1 to about 20 ethylene oxide groups, and $C_4$-$C_{24}$ alkyl, aryl or alkaryl phosphate esters or their alkoxylated analogs having 1 to about 40 ethylene, propylene or butylene oxide units, or mixtures thereof.

Additional suitable surfactants include nonionic surfactants of $C_6$-$C_{24}$ alcohol ethoxylates (preferably $C_6$-$C_{14}$ alcohol ethoxylates) having 1 to about 20 ethylene oxide groups (preferably about 9 to about 20 ethylene oxide groups); $C_6$-$C_{24}$ alkylphenol ethoxylates (preferably $C_8$-$C_{10}$ alkylphenol ethoxylates) having 1 to about 100 ethylene oxide groups (preferably about 12 to about 20 ethylene oxide groups); $C_6$-$C_{24}$ alkylpolyglycosides (preferably $C_6$-$C_{20}$ alkylpolyglycosides) having 1 to about 20 glycoside groups (preferably about 9 to about 20 glycoside groups); $C_6$-$C_{24}$ fatty acid ester ethoxylates, propoxylates or glycerides; and $C_4$-$C_{24}$ mono or dialkanolamides.

In addition, useful surfactants include those that perform a dual function. For example, surface active compounds such as mono, di and trialkyl phosphate esters may be added to the composition to aid in wetting, but also to suppress foam and provide some antimicrobial activity. Such phosphate esters would generally be produced from aliphatic linear alcohols, there being from 8 to 12 carbon atoms in the aliphatic portions of the alkyl phosphate esters. Nonionic surfactants, fatty acid salts, and silicone-based materials can be added to reduce foam formation herein. Such materials tend to enhance performance of the other components of the composition.

Highly preferred surfactants include food additive surfactants. Thus, the disclosure includes food grade, or naturally derived or food surface compatible, wetting and detersive agents, for example, linoleic acid, sorbitan esters, sugar esters, lecithins and ethoxylated lecithins, PEG alkylates, linear alkylbenzene sulfonates, stearyl citrate, alkyl naphthalene sulfonates, Pluronics, and various short-chain fatty acids.

Potentiators

The exemplary octanoic acid-based antimicrobial composition may optionally include a potentiator such as a terpenoid. Terpenoids are defined as materials with molecular structures containing carbon backbones made up of isoprene (2-methylbuta-1,3-diene) units. Isoprene contains five carbon atoms and therefore, the number of carbon atoms in any terpenoid is a multiple of five. It is believed that terpenoids assist in promoting the uptake of antimicrobial compounds and preservatives by cells of bacteria and fungi, thereby increasing the efficacy of the antimicrobial compound or preservative. See U.S. Pat. No. 6,319,958 and DE 195 23 320 which are incorporated by reference in their entirety. Some non-limiting examples of terpenoids include α-terpinene, cineole, citral, citronellal, citronellol, farnesol, geraniol, limonene, linalool, methone, nerolidol, terpineol, camphene, menthone, myrcene, nerol, tetrayhydrogeraniol, tetrahydrolinalool, apritone, and bisabolol. The terpenoid is preferably farnesol, nerolidol, bisabolol, or apritone.

Flavoring Aids, Fragrances, and Dyes

The exemplary octanoic acid-based antimicrobial composition may include a flavoring aid for imparting a desired flavor to a food product or for masking an undesirable flavor. Some non-limiting examples of flavoring aids include marinades, tenderizers, and spices typically associated with food products.

The composition may also include a fragrance including natural and synthetic fragrances. Some non-limiting examples of fragrances include aldehydes, ketones, esters, essential oils, and the like.

Finally, the composition may include a dye. Some non-limiting examples of suitable dyes include FD&C and D&C dyes.

A person of ordinary skill in the art will be able to formulate compositions depending on the desired active antimicrobial agent, and the desired physical properties so that the various ingredients do not adversely affect each other.

In certain embodiments, it may be desirable for the pH of the composition to be substantially equivalent to the isoelectric point of the fresh meat protein. The isoelectric point of meat occurs at a pH of about 5.4 to 5.6. At the isoelectric point of proteins, the number of positive and negative charges are the same and the net charge is zero. As the pH of the meat and its immediate environment reach the isoelectric point of meat proteins, the protein spaces reduce, resulting in a reduced water holding capacity (WHC) of the meat. It is theorized that antimicrobial compositions at a pH within the range of 5.4 to 5.6 take advantage of the reduced WHC because the meat tissue holds less water and the dilution effect of the active antimicrobial species within the composition is reduced, thereby providing for improved bactericidal efficacy. In addition, antimicrobial compositions at a pH within the range of 5.4 to 5.6 exhibit substantially reduced organoleptic impact compared to those at pH levels higher or lower than that range.

In certain embodiments, it may be desirable for the active antimicrobial agent to have a lasting effect once the food product is packaged and continue to provide a suppression of growth. For example, it may be desirable under Alternative 1 for the antimicrobial composition to continue to provide an antimicrobial effect over the entire shelf life of the food product and prevent the growth of microorganisms. In other embodiments, it may be desirable for the active antimicrobial agent to cease having an antimicrobial effect shortly after packaging.

The antimicrobial compositions may be formulated as a concentrate or a ready-to-use composition. A concentrate refers to the composition that is diluted to form the ready-to-use composition. The ready-to-use composition refers to the composition that is applied to a surface. A concentrate may be advantageous because it is less expensive to ship than a ready-to-use composition and it takes up less storage space. The concentrate may then be diluted to form a ready-to-use composition prior to application of the ready-to-use composition.

The antimicrobial composition may have a range of physical forms. For example, the antimicrobial composition may be a solid, liquid, structured or thickened liquid or gel, foam, pellet, prill, or a powder. Further, the antimicrobial composition may be a part of a dissolvable film such as polyvinylalcohol (PVA) or cellulose film, or the antimicrobial composition may be blown or extruded with a film, impregnated in a film, or coated on a film. The antimicrobial composition may be formulated as a flavored food product like a marinade, salad dressing, or a tenderizing solution. Finally, the antimicrobial composition may be part of the packaging that is applied to the food product.

Food Product

As used herein, the term "food product" or "food" refers to any food or beverage item that may be consumed by humans or mammals. Some non-limiting examples of a "food product" or "food" include the following: meat products including ready-to-eat ("RTE") meat and poultry products, processed meat and poultry products, cooked meat and poultry products, and raw meat and poultry products including beef, pork, and poultry products; fish products including cooked and raw fish, shrimp, and shellfish; produce including whole or cut fruits and vegetables and cooked or raw fruits and vegetables; pizzas; ready made breads and bread doughs; cheese, eggs, and egg-based products; and pre-made food items such as pre-made sandwiches. The present disclosure is particularly useful for meat and poultry products.

Specific examples of poultry products include all forms of any bird kept, harvested or domesticated for meat or eggs, including chicken, turkey, ostrich, game hen, squab, guinea fowl, pheasant, quail, duck, goose, emu, or the like, and the eggs of those birds. Poultry includes whole, sectioned, processed, cooked or raw poultry and encompasses all forms of poultry flesh, by-products, and side products. Poultry flesh includes muscle, fat, organs, skin, bones and body fluids (blood, purge, etc.). Further, the poultry can be smoked, cured, sectioned, formed, whole, minced, and chopped.

Specific examples of meat products include beef, pork, veal, buffalo, or lamb. The meat product can be smoked, cured, processed, whole, whole muscle, primal cuts, subprimal cuts, trim, raw, cooked, or ready-to-eat (RTE) deli or luncheon meats like turkey, ham, roast beef, hot dogs, and sausages. Meat flesh includes muscle, fat, organs, skin, bones and body fluids. Raw beef products include primal cuts such as chuck, rib, short loin, sirloin, round, brisket, plate, and flank, and associated sub primal cuts such as blade and arm cuts, back ribs, rib-eye steaks and roasts, rib roasts, top loin, tenderloin, bottom butt, top butt, sirloin steak, bottom round, top round, eye round, brisket, fore shank, short ribs and flank.

Raw pork products include primal cuts such as shoulder, loin, leg/ham and side/belly, and associated sub primal cuts including blade shoulder, picnic shoulder, rib end, center cut, sirloin, butt half, shank half, side rib, and pork side.

Fish products include sea food, fish, scallops, shrimp, crab, octopus, mussels, squid and lobster. Fish products can be smoked cured, processed, whole, or sectioned.

Additionally, the present disclosure can be used on bacon and pre-made, pre-assembled, or pre-packaged meals such as TV dinners and microwaveable entrees or meals.

Application of the Antimicrobial Composition

The antimicrobial composition may be applied to the food product before, after, or substantially simultaneously with the packaging of the food product.

Alternatively, the compositions may be applied to the food product with packaging. In one embodiment, there are at least two antimicrobial agents, referred to as a first and second antimicrobial agent. The first and second antimicrobial agents may be part of one composition, or may be part of separate compositions mixed prior to application, or separate compositions applied substantially simultaneously or separate compositions applied sequentially. When applied sequentially, the first and second antimicrobial agent can be applied within about 7 days, about 5 days, about 48 hours, about 36 hours, about 24 hours, about an hour of each other, about 30 minutes of each other, about 10 minutes of each other, and about 1 minute of each other, about 30 seconds of each other, about 10 seconds of each other and about 5 seconds of each other. In an embodiment, the amount of time in between the application of the first antimicrobial agent and the second antimicrobial agent is reduced as much as possible. If the amount of time in between application of the first and second antimicrobial agents is reduced, it will allow the first and second antimicrobial to intermingle with each other and allow for improved control of microorganisms. In some embodiments, it may be desirable for the first antimicrobial agent to be oxidative and the second antimicrobial agent to be non-oxidative. In one specific embodiment, it may be beneficial to use an acidic antimicrobial agent followed by an acidic marinade solution. In this embodiment, the acidic marinade does not neutralize any residual acidic antimicrobial agent, which may allow the antimicrobial to continue having an effect while the food product is marinating.

The antimicrobial composition may be applied to the food product in several ways. In some embodiments, the antimicrobial composition may be applied directly to the food product in many ways including spraying, misting, rolling, fogging and foaming the antimicrobial composition directly onto the food product, and immersing the food product in the antimicrobial composition. The antimicrobial composition may be applied in an injection solution, or the antimicrobial composition may be applied as part of a marinade or tenderizer that is applied to the food product.

In some embodiments, the antimicrobial composition may be indirectly applied to the food product. The antimicrobial composition may be applied to the food product by applying the composition to processing equipment such as knives, cutting tools, etc. and using the processing equipment to transfer the composition to the food product. Also, the antimicrobial composition may be applied to the packaging before inserting the food product into the packaging or before applying the packaging to the food product. The antimicrobial composition then contacts the food product when the food product is packaged. The antimicrobial composition may be applied to the packaging after the food product has been inserted into the packaging or after applying the packaging to the food product (e.g., the antimicrobial composition may be squirted or otherwise introduced into the packaging after the food has been placed in the packaging but before sealing the packaging). The antimicrobial composition may be applied to the food product substantially simultaneously with the packaging of the food product. Additionally, the food packaging or food casing (e.g., hot dog or sausage casing) may be coated, treated, or impregnated with the antimicrobial composition, and the antimicrobial composition is applied to the food product when the food product is placed inside the packaging or casing.

When using the food casing to apply the antimicrobial composition, the antimicrobial composition may be applied to the food product, specifically the hot dog or sausage, by coating, treating, or impregnating the casing with the antimicrobial composition prior to stuffing the casing with the meat product and prior to cooking. While not wanting to be bound to any scientific theory, it is believed that the moisture content of the food product will release the antimicrobial composition from the casing and allow it to coat the surface of the food product. Once the food product is cooked and the casing is removed, the antimicrobial composition is left on the surface of the food product to provide an antimicrobial barrier. The food product is then packaged and the antimicrobial composition is then optionally activated using activation energy.

In an embodiment, the antimicrobial composition can be applied to a food product, and a meat, poultry, or fish product in particular, by soaking or immersing the food product in the composition. In an embodiment, the food product is allowed to soak in the antimicrobial composition from about 30 seconds to 30 minutes, from about 45 seconds to 20 minutes, and from about 1 minute to 10 minutes. Thereafter, the food product may be processed as part of a tenderizing process. The tenderizing process may use chemical tenderizing or mechanical tenderizing. Examples of chemical tenderizing include naturally aging meat or poultry where the natural enzymes and bacteria of the meat tenderize the meat over time, applying enzymes such as papain, bromelain, and ficin, using acids such as acetic acid (often found in vinegars used in tenderizing and marinating solutions), lactic acid, and citric acid, and spices. Examples of mechanical tenderizing include using a roller, vacuum tumbler, meat pounder or hammer, a needle tenderizer, a fork, an injector, a grinder, or a combination of these processes. These processes are especially useful for tenderizing tougher cuts of meat, poultry, and fish.

When the antimicrobial composition is applied as part of a tenderizing process such as that described above, the antimicrobial composition can either be applied directly to the food surface, or can be applied to the food processing tool, which then applies the composition to the food surface.

Table A describes some non-limiting methods of tenderizing. Table A is exemplary only. Additional methods are envisioned, including methods that include more or fewer steps, additional antimicrobial agents or compositions, pauses in between steps, and the like.

TABLE A

| | | | Exemplary Method Embodiments | | | | | |
|---|---|---|---|---|---|---|---|---|
| Step 1 | Step 2 | Step 3 | Step 4 | Step 5 | Step 6 | Step 7 | Step 8 | Step 9 |
| Apply a first antimicrobial agent to a meat or poultry product. | Divide the meat or poultry product into smaller pieces. | Soak the meat or poultry product in the first antimicrobial | Tenderize the meat or poultry product. | Marinade the meat or poultry product. | Package the meat or poultry product. | Optional activation energy step. | Store the packaged meat or poultry product. | Sell packaged meat or poultry product. |
| Apply a composition having a first and second antimicrobial agent to a meat or poultry product. | Divide the meat or poultry product into smaller pieces. | Soak the meat or poultry product in either the first or second (or a combination) antimicrobial agent. | Tenderize the meat or poultry product. | Marinade the meat or poultry product. | Package the meat or poultry product. | Optional activation energy step. | Store the packaged meat or poultry product. | Sell packaged meat or poultry product. |
| Apply a first antimicrobial agent to a meat or poultry product. | Divide the meat or poultry product into smaller pieces. | Soak the meat or poultry product in a second antimicrobial | Tenderize the meat or poultry product. | Marinade the meat or poultry product. | Package the meat or poultry product. | Optional activation energy step. | Store the packaged meat or poultry product. | Sell packaged meat or poultry product. |
| Apply a first antimicrobial agent to a meat or poultry product. | Divide the meat or poultry product into smaller pieces. | Soak the meat or poultry product in the first antimicrobial | Tenderize the meat or poultry product. | Marinade the meat or poultry product in marinade and an antimicrobial agent. | Package the meat or poultry product. | Optional activation energy step. | Store the packaged meat or poultry product. | Sell packaged meat or poultry product. |

TABLE A-continued

Exemplary Method Embodiments

| Step 1 | Step 2 | Step 3 | Step 4 | Step 5 | Step 6 | Step 7 | Step 8 | Step 9 |
|---|---|---|---|---|---|---|---|---|
| Divide the meat or poultry product into smaller pieces. | Soak the meat or poultry product in the first antimicrobial | Tenderize the meat or poultry product. | Store the meat or poultry product. | Sell packaged meat or poultry product. | | | | |
| Soak the meat or poultry product in the first antimicrobial | Tenderize the meat or poultry product. | Marinade the meat or poultry product. | Package the meat or poultry product. | Store the packaged meat or poultry product. | Sell packaged meat or poultry product. | | | |
| Apply a first antimicrobial agent to a meat or poultry product. | Divide the meat or poultry product into smaller pieces. | Soak the meat or poultry product in a second antimicrobial | Tenderize the meat or poultry product. | Marinade the meat or poultry product in a marinade and a third antimicrobial agent. | Package the meat or poultry product. | Optional activation energy step. | Store the packaged meat or poultry product. | Sell packaged meat or poultry product. |
| Apply a first antimicrobial agent to a meat or poultry product. | Divide the meat or poultry product into smaller pieces. | Apply an antimicrobial agent to a tenderizing tool. | Tenderize the meat or poultry product and apply the antimicrobial agent to the meat or poultry product using the tenderizing tool. | Marinade the meat or poultry product. | Package the meat or poultry product. | Optional activation energy step. | Store the packaged meat or poultry product. | Sell packaged meat or poultry product. |
| Soak the meat or poultry product in the first antimicrobial Apply a chemical tenderizer to the meat or poultry product where the chemical tenderizer also includes an antimicrobial agent. | Tenderize the meat or poultry product. | Sell packaged meat or poultry product. | | | | | | |

When used in a tenderizing process, the method can include additional steps. An exemplary process can include one or more of the following steps in various orders and combinations: starting with a whole cut of meat, poultry, or fish, soaking the meat, poultry, or fish in an antimicrobial composition, slicing or cutting the whole product into smaller pieces, soaking the smaller pieces, subjecting the smaller pieces to a tenderizing process, marinating the tenderized product for a period of time where the marinade can optionally include the antimicrobial composition, packaging the marinated product, applying an activated energy source to the packaged product, storing the packaged product, and selling the packaged product to a consumer, for example in a restaurant, or to a deli or supermarket, or consuming the food product in a home kitchen. Alternatively, the process can include one or more of the following steps: starting with a whole cut of meat, poultry, or fish, soaking the meat, poultry, or fish in an antimicrobial composition, slicing or cutting the whole product into smaller pieces, applying the antimicrobial composition to a tenderizing tool, subjecting the smaller pieces to a tenderizing process while also applying the antimicrobial composition to the smaller pieces, marinating the tenderized product for a period of time where the marinade can optionally include the antimicrobial composition, packaging the marinated product, applying an activated energy source to the packaged product, storing the packaged product, and selling the packaged product to a consumer, for example in a restaurant, or to a deli or supermarket, or consuming the food product in a home kitchen. The method could optionally include periodically treating the processing tools or meat slicers with the antimicrobial composition. The method is preferably used in a way that results in at least a 1 log, 1.5 log, or 2 log reduction in pathogenic bacteria on the surface of the meat, poultry, or fish product.

The antimicrobial composition can be applied at room temperature (9° C. to 30° C.), at chilled temperatures (such as those found in institutional freezers (−20° C. to 0° C.) and refrigerators (1° C. to 8° C.), or at elevated temperatures (such as those found during a shrink-wrap process (30° C. to 99° C.)).

When more than one antimicrobial agent is used, the first and second antimicrobial agents may be applied directly or indirectly using any of the above described application methods or combination of methods. For example, the first antimicrobial agent may be applied using one method and the second antimicrobial agent may be applied using the same method. Alternatively, the first antimicrobial agent may be applied using one method and the second antimicrobial agent may be applied using a different method.

Table B describes some non-limiting methods. It is understood that in the following table, the first and second antimicrobial agents may be selected from the list of antimicrobial agents described in the application. Further, it is understood that the application step may involve any of the previously described methods of application. Finally, it is understood that Table B is intended to be exemplary only and that other methods are envisioned including methods that include fewer and additional method steps, additional antimicrobial agents or compositions, pauses in between steps, and the like.

TABLE B

Exemplary Method Embodiments

| Step 1 | Step 2 | Step 3 | Step 4 | Step 5 |
|---|---|---|---|---|
| Apply a first antimicrobial agent to a food product | Package the food product | Seal the packaging | Optional activation energy step | |
| Apply a composition to a food product having a first and second antimicrobial agent | Package the food product | Seal the packaging | Optional activation energy step | |
| Apply a first and second antimicrobial agent in separate compositions substantially simultaneously to a food product | Package the food product | Seal the packaging | Optional activation energy step | |
| Apply a first antimicrobial agent to a food product | Apply a second antimicrobial agent to a food product | Package the food product | Seal the packaging | Optional activation energy step |
| Place food product in packaging with a first antimicrobial agent | Seal the packaging | Optional activation energy step | | |
| Place food product in packaging with a first and second antimicrobial agent | Seal the packaging | Optional activation energy step | | |
| Apply a first antimicrobial agent | Place food product (with first antimicrobial agent on the food product) in packaging with a second antimicrobial agent inside the packaging | Seal the packaging | Optional activation energy step | |
| Apply percarboxylic acid composition to food product | Apply carboxylic acid composition to food product | Package food product | Seal the packaging | Optional activation energy step |
| Apply percarboxylic acid composition to food product | Apply an acidified sodium chlorite composition to food product | Package food product | Seal the packaging | Optional activation energy step |
| Apply acidified sodium chlorite composition to food product | Apply carboxylic acid composition to food product | Package food product | Seal the packaging | Optional activation energy step |
| Apply acidified sodium chlorite composition to food product | Apply percarboxylic acid composition to food product | Package food product | Seal the packaging | Optional activation energy step |
| Apply a composition having a percarboxylic acid and carboxylic acid to food product | Package food product | Seal the packaging | Optional activation energy step | |
| Apply a composition having a percarboxylic acid and acidified sodium chlorite to food product | Package food product | Seal the packaging | Optional activation energy step | |
| Apply a composition having an acidified sodium chlorite and carboxylic acid to food product | Package food product | Seal the packaging | Optional activation energy step | |

TABLE B-continued

Exemplary Method Embodiments

| Step 1 | Step 2 | Step 3 | Step 4 | Step 5 |
|---|---|---|---|---|
| Apply percarboxylic acid composition to food product | Place the food product in packaging with a carboxylic acid composition | Seal the packaging | Optional activation energy step | |
| Apply percarboxylic acid composition to food product | Place the food product in packaging with an acidified sodium chlorite composition product | Seal the packaging | Optional activation energy step | |
| Apply acidified sodium chlorite composition to food product | Place the food product in packaging with a carboxylic acid composition | Seal the packaging | Optional activation energy step | |
| Apply acidified sodium chlorite composition to food product | Place the food product in packaging with a percarboxylic acid composition | Seal the packaging | Optional activation energy step | |
| Place food product in packaging with a composition having a percarboxylic acid and carboxylic | Seal the packaging | Optional activation energy step | | |
| Place food product in packaging with a composition having a percarboxylic acid and acidified sodium chlorite | Seal the packaging | Optional activation energy step | | |
| Place food product in packaging with a composition having an acidified sodium chlorite and carboxylic acid | Seal the packaging | Optional activation energy step | | |

Packaging

In some embodiments, food products may be packaged in a variety of ways including vacuum packaging, shrink wrapping, and modified atmosphere packaging. Further, the food products may be packaged in a variety of packaging materials including bags, pouches, films such as shrink films and non-shrink films, trays, bowls, clam shell packaging, web packaging, and hot dog/frankfurter packaging. The methods are especially useful in conjunction with the shrink wrap packaging that is used in a shrink wrap process. The food products may also be "packaged" or stored in storage containers or bins, as in the case of food that is processed in restaurants and served directly to customers versus being packaged and sold to customers at a grocery store.

The packaging of the food product may occur before, after, or substantially simultaneously with the application of the antimicrobial composition. In the cases where the antimicrobial composition is applied first, and the packaging takes place in a separate step, the packaging step preferably takes place no more than 30 minutes after the application of the antimicrobial composition, no more than 10 minutes after the application of the antimicrobial composition, no more than 60 seconds after the application of the antimicrobial composition, and no more than 5 seconds after the application of the antimicrobial composition. Reducing the amount of time in between the application of the antimicrobial composition to the food product, and when the food product is placed inside the packaging, reduces the likelihood that the food product will be re-contaminated in between the two steps.

Activation Energies

Activation energy may optionally be applied to a product to activate the antimicrobial composition. When using activation energy, enough energy must be applied to the antimicrobial composition for a sufficient period of time in order to activate it. The exact amount of energy and length of time may vary depending on the antimicrobial composition, the food product, and the method of energy application. A person skilled in the art will be able to select the desired activation energy, and duration depending on the antimicrobial composition and food product.

Non-limiting examples of suitable activation energies that may be used with all of the methods described herein include heat, pressure, ultraviolet light, infrared light, ultrasonic, radio frequency, microwave radiation, gamma radiation, and the like. Preferred activation energies include heat, pressure, and microwave radiation. It is understood that different activation energies will have different parameters (i.e. amount, duration). A person skilled in the art will be able to select the activation energy and parameters to achieve the desired result.

When heat is used as the activation energy, the heat may be applied in several ways including but not limited to hot water, steam, and hot air.

When using heat as the activation energy, the temperature of the heat is preferably from about 160° F. (71° C.) to about 210° F. (99° C.), from about 180° F. (82° C.) to about 200° F. (93° C.), and from about 190° F. (88° C.) to about 200° F. (93° C.). It is understood that the temperatures provided describe the temperature of the composition (e.g., the temperature of the water or air) being applied to the packaged food product, and not the temperature of the food product. For other activation energies described, the activation energy used should correspond to the energy applied using heat at the above temperatures.

Non-limiting examples of application time for the above described activation energies, that may be used in conjunction with all of the methods, include about less than 60 seconds, from about 1 to about 60 seconds, from about 2 to about 20 seconds, and from about 3 to about 10 seconds.

It is understood that the heat activation of the present method is different from thermal surface treatment of a food product (e.g., hot water or pasteurization). In a thermal surface treatment process, a thermal source, such as hot water or steam, is applied to a food product either directly to the surface of the food product, or indirectly, by applying heat to the packaging surface. Typical thermal surface treatments apply high temperature heat and/or long exposure times in an effort to reduce the presence of microorganisms (e.g., provide a "lethal" amount of heat to kill microorganisms). Further, thermal surface treatments require large equipment capital investments and take up a lot of space in a processing facility. Finally, thermal surface treatments have negative organoleptic effects on the food product including color and odor changes and cause increases in liquid purge volumes on meat products. The heat activation provides little, if any, reduction in the level of microorganisms (e.g., a "sub-lethal" amount of heat) because the purpose of the addition of heat is to activate the applied antimicrobial composition which in turn reduces the level of microorganisms, not to use the heat itself to reduce the level of microorganisms. Additionally, the heat used in the method does not impact organoleptic properties or purge volumes.

While not wanting to be bound by any scientific theory, it is believed that the method works in one of two ways. First, energy is known to increase the kinetics of reactions responsible for cell death. Accordingly, the application of energy to food products treated with an antimicrobial composition may increase the efficacy of the antimicrobial composition based on this principle. Second, it is known that the phospholipids in the bilayer of bacterial membranes undergo radical changes in physical state over narrow temperature ranges, sometimes referred to as phase transition temperatures or melting temperatures. Similar conformational or denaturative changes take place in the intracellular organelles. It is believed that the method takes advantage of these phenomenons by exposing microorganisms to energy in order to reach or pass the phase transition temperature and creating a liquid crystal conformation in the bilayer in which the bilayer becomes more permeable to the antimicrobial composition. Further, the targeted organelles within the microorganism also exhibit conformational changes that make them more susceptible to the antimicrobial composition.

Definitions

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Weight percent, percent by weight, % by weight, wt %, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4 and 5).

As used in this specification and the appended claims, the singular forms "a," "an," and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The use of the terms "antimicrobial" in this application does not mean that any resulting products are approved for use as an antimicrobial agent.

For a more complete understanding of the disclosure, the following examples are given to illustrate some embodiment. These examples and experiments are to be understood as illustrative and not limiting. All parts are by weight, except where it is contrarily indicated.

EXAMPLES

Example 1

The following is an example of an octanoic acid composition used in the method of the present disclosure where the octanoic acid composition is activated by passage of the food product through a simulated shrink tunnel.

For this example, a solution of 1,000 ppm to about 10,000 ppm octanoic acid, from about 1.0% to about 4.0% ethylene oxide/propylene oxide co-polymer (Pluronic F108), and about 2.0 to about to about 6.0% propylene glycol is adjusted to pH 1.0 with any GRAS acid such as phosphoric acid.

TABLE 1

| Octanoic Acid Composition | |
|---|---|
| Level (Wt. %) | Raw Material |
| 88.15 | Water |
| 2.85 | Pluronic F108 |
| 5.00 | Propylene Glycol |
| 3.00 | Phosphoric Acid (75%) |
| 1.00 | Octanoic Acid |

Final Solution pH ~1.18

An equal-part mixture of five strains of *L. monocytogenes* including ATCC 19112, ATCC 19114, ATCC 19115, ATCC 7644, and NCTC 10890 suspended in phosphate buffered dilution water was used as the inoculum. 0.1 milliliters of the inoculum was placed onto a RTE turkey breast, spread with a sterile bent glass rod, followed by storage at 5° C. for 10 minutes to allow for bacterial attachment. RTE turkey breasts were then sprayed with the antimicrobial composition described in Table 1 for 15 seconds. In this example, the volume of the antimicrobial composition applied to each RTE turkey breast was about 15 milliliters. The turkey breasts were placed in bags. The bags were immediately vacuum-packaged, and submerged in 200° F. water for 15 seconds to simulate passage through a shrink tunnel. The bags were then submerged in a 2° C. water bath for ≧1 minute. Two replicates were completed per treatment. The samples were stored at 5° C. for 24 hours before being analyzed for populations of *L. monocytogenes*. Fifty milliliters of University of Vermont broth were added to each bag. The RTE turkey breasts were tumbled to recover cells. The resulting suspension was plated in Modified Oxford Medium Agar and the plates were incubated at 35° C. for 72 hours prior to enumeration of *L. monocytogenes*.

TABLE 2

Efficacy of Octanoic Acid and Heat on
*L. monocytogenes* on RTE Turkey

| Treatment | Heat Exposure (sec) | Average $Log_{10}$ CFU/sample | Average $Log_{10}$ Reduction |
|---|---|---|---|
| Water | 0 | 7.61 | NA |
| 1% Octanoic Acid | 0 | 6.41 | 1.20 |
|  | 15 | 5.57 | 2.04 |

Following treatment with 1% octanoic acid, a 1.20 log reduction of *L. monocytogenes* resulted. However, the activation of octanoic acid reduced *L. monocytogenes* populations by 2.04 logs within the food product. It has been published that naturally occurring *L. monocytogenes* contamination levels in RTE meat products is generally low (about <1 CFU/g). Gombas, D. E., et al. (2003). Survey of *Listeria monocytogenes* in Ready-to-Eat Foods. *Journal of Food Protection* (66). 559-569. Thus, once activated, the antimicrobial composition in Example 1 renders the RTE product essentially free of *Listeria monocytogenes* contamination. These results show that octanoic acid meets FSIS requirements of a post-lethality treatment as described in FSIS Form 10,240-1.

Example 2

The following example determined the efficacy of 1.0% octanoic acid at reducing *L. monocytogenes* on RTE oven roasted turkey breasts where the octanoic acid was activated by simulating passage of the food product through a simulated immersion shrink tunnel. For this example a solution of 1% octanoic acid using 3% Polysorbate 20 as a coupler was prepared and acidified using 2.55% citric acid. Four test solutions were prepared and each pH adjusted to a different pH from pH 2 to pH 5 using up to 1.08% sodium hydroxide. An equal-part mixture of five strains of *L. monocytogenes*, including ATCC 19112, ATCC 19114, ATCC 19115, ATCC 7644, and NCTC 10890, suspended in a phosphate buffered dilution water, was used as the inoculum. Sample surfaces were spot-inoculated with 50 microliters of the inoculum. The inoculum was spread using a sterile bent glass rod. Inoculated samples were stored at 5° C. for 30 minutes before treatment to allow for bacterial attachment. The inoculated turkey samples were transferred to shrink bags. Fifteen milliliters of the octanoic acid formula were added to bags which were immediately vacuum-packaged and submerged in water heated to 200° F. for 10 seconds (treated samples) or 2 seconds (untreated control samples). Three replicates were completed per treatment. The samples were stored at 5° C. for 2 hours and 21 days before analyzed for populations of *L. monocytogenes*. Fifty milliliters of University of Vermont broth were added to each bag. The turkey samples were tumbled for 50 rotations and the resulting suspension was plated in Modified Oxford Medium Agar. Plates were incubated at 35° C. for 48 hours before the pathogen was enumerated.

TABLE 3

Efficacy of 1.0% Octanoic Acid Acidified with Citric Acid on *L. monocytogenes* on RTE Oven Roasted Turkey Breasts

| Treatment Solution | Average $Log_{10}$ CFU/sample At 2 Hours | $Log_{10}$ Reduction Vs. Control At 2 Hours | Average $Log_{10}$ CFU/sample At 21 Days | $Log_{10}$ Reduction Vs. Control At 21 Days |
|---|---|---|---|---|
| Untreated Control | 4.93 | Not Applicable | 8.68 | Not Applicable |
| 1.0% Octanoic Acid @ pH 2 | 2.28 | 2.65 | 2.48 | 6.20 |
| 1.0% Octanoic Acid @ pH 3 | 2.46 | 2.47 | 3.79 | 4.89 |
| 1.0% Octanoic Acid @ pH 4 | 2.13 | 2.80 | 3.94 | 4.74 |
| 1.0% Octanoic Acid @ pH 5 | 2.46 | 2.47 | 3.91 | 4.77 |

The treatment of the oven roasted turkey breasts with 1.0% octanoic acid resulted in a >2.4 log reduction of *L. monocytogenes* at 2 hours and >4.7 log reduction of *L. monocytogenes* after 21 days of storage. Therefore, once activated, the antimicrobial compositions substantially suppress the growth of *L. monocytogenes* on treated RTE foods. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination. This example shows that the use of octanoic acid meets FSIS requirements of a post-lethality treatment as described in FSIS Form 10, 240-1, and may meet the requirements of an antimicrobial agent or process which suppresses the growth of *L. monocytogenes* as described in FSIS Form 10,240-1.

Example 3

The following example determined the efficacy of an octanoic acid solution at killing *Listeria monocytogenes* on turkey frankfurters when used in the method of the present disclosure where the octanoic acid composition was activated by simulating passage of the food product through a simulated immersion shrink tunnel.

For this example, solutions of 990, 5,000 and 10,000 ppm octanoic acid using sodium 1-octanesulfonate as a coupler were prepared and acidified using phosphoric acid. The 10,000 ppm octanoic acid solution was made with 1% octanoic, 1% 1-hydroxyethylidene-1,1-diphosphonic acid, 1.25% sodium 1-octanesulfonate, and was acidified to pH 1.2 using phosphoric acid. The 5,000 ppm octanoic acid solution was made using a 50% of the 10,000 ppm octanoic acid, 50% water and a pH of 1.4. The 990 ppm octanoic acid solution was made with 9.9% of the 10,000 ppm octanoic acid, 89.42% water and brought to pH 1.5 with 0.68% phosphoric acid. An equal-part mixture of five strains of *L. monocytogenes* including ATCC 19112, ATCC 19114, ATCC 19115, ATCC 7644, and NCTC 10890, suspended in phosphate buffered dilution water, was used as the inoculum. 0.125 milliliters of the inoculum was pipetted onto each turkey frankfurter within a sterile polyethylene bag. The frankfurters were stored at 10° C. for 10 minutes to allow for bacteria attachment. 1 milliliter of the designated octanoic acid formula (or sterile water for the control) was added to each bag. Bags were vacuum-packaged, and submerged in 200° F. water for 15 seconds to simulate passage through an immersion shrink tunnel. The bags were then submerged in a 2° C. water bath for >1 minute. Three replicates were completed per treatment. The samples were stored at 5° C. for 24 hours before analyzed for populations of *L. monocytogenes*. Fifteen milliliters of University of Vermont broth were added to each bag. The frankfurters were massaged for 1 minute to recover cells. The resulting suspension was plated in Modified Oxford Medium Agar and the plates were incubated at 35° C. for 72 hours prior to enumeration of *L. monocytogenes*.

TABLE 4

Efficacy of 990, 5,000 and 10,000 ppm Octanoic Acid in Killing *L. monocytogenes* on Turkey Frankfurters

| Treatment Solution | Heat Exposure (sec) | Average $Log_{10}$ CFU/sample | $Log_{10}$ Reduction Vs. Control |
|---|---|---|---|
| Water (control) | 15 Sec @ 200 F. | 5.25 | Not Applicable |
| 990 ppm Octanoic Acid | 15 Sec @ 200 F. | 4.56 | 0.69 |
| 5,000 ppm Octanoic Acid | 15 Sec @ 200 F. | 3.90 | 1.35 |
| 10,000 ppm Octanoic Acid | 15 Sec @ 200 F. | 2.59 | 2.66 |

The treatment of turkey frankfurters with 10,000 ppm octanoic acid with heat activation resulted in a 2.66 log reduction of *L. monocytogenes*. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination. This example shows again that octanoic acid meets FSIS requirements of a post-lethality treatment as described in FSIS Form 10,240-1.

Example 4

The following example determined the efficacy of a 1.0% octanoic acid solution against *L. monocytogenes* on roast beef.

For this example, a solution of 1% octanoic acid using 3% Polysorbate 20 as a coupler was prepared and acidified to pH 2.0 using 0.3% phosphoric acid. A second solution of 1% octanoic acid using 3% Polysorbate 20 as a coupler was prepared which was brought to pH 4.0 using 2.55% citric acid and 0.6% sodium hydroxide. The efficacy of both formulas was evaluated. An equal-part mixture of five strains of *L. monocytogenes*, including Scott A (serotype 4b, human isolate), H7750 (not serotyped, frankfurter isolate), AC33 (not serotyped, cooked ham isolate), LM108M (serotype 1/2b, salami isolate), and F6854 (serotype 1/2a, frankfurter isolate), suspended in phosphate buffered dilution water were used. Roast beef samples were spot-inoculated with 50 microliters of the inoculum. The inoculum was spread using a sterile bent glass rod. Inoculated RTE food product samples were stored at 5° C. for 30 minutes before treatment to allow for bacterial attachment. RTE food product samples were placed in shrink bags. The RTE food product samples were treated with octanoic acid via a direct application of about 15 milliliters of either octanoic acid formula to each treated sample. The bags were immediately vacuum-packaged with a 2-second submersion in water heated to 200° F. Three replicates were completed per treatment. Samples were stored at 5° C. for 24 hours before being analyzed for population of *L. monocytogenes*. Fifty milliliters of University of Vermont broth were added to each bag. RTE food product samples were tumbled for 50 rotations and the resulting suspension was plated in Modified Oxford Medium Agar. Plates were incubated at 35° C. for 48 hours before the pathogen was enumerated.

TABLE 5

Efficacy of 1% Octanoic Acid and Heat in Killing *L. monocytogenes* on Roast Beef

| Antimicrobial Treatment | Heat | Average $Log_{10}$ CFU/sample | $Log_{10}$ Reduction Vs. Control |
|---|---|---|---|
| None (control) | 2 sec | 4.31 | NA |
| 1% Octanoic Acid acidified to pH 2 with phosphoric acid | 2 sec | 3.13 | 1.18 |
| 1% Octanoic Acid acidified to pH 4 with citric acid | 2 sec | 2.22 | 2.09 |

Treatment of roast beef with 1% octanoic acid acidified to pH 2 with phosphoric acid and heat resulted in a 1.18 log reduction of *L. monocytogenes*. Treatment of roast beef with 1% octanoic acid acidified to pH 4 with citric acid and heat resulted in a 2.09 log reduction of *L. monocytogenes*. It has been published that naturally occurring *L. monocytogenes* contamination levels in RTE meat products is generally low (about <1 CFU/g). Thus, the antimicrobial composition renders the RTE product essentially free of *Listeria monocytogenes* contamination. This example shows that octanoic acid meets FSIS requirements of a post-lethality treatment as described in FSIS Form 10,240-1.

Example 5

The following example demonstrates the improved efficacy of sequential treatment with an oxidative composition followed by a fatty acid composition in killing *Listeria monocytogenes* on a ready-to-eat turkey product in the method.

For this example sodium chlorite was diluted in water from about 500 ppm to about 1,200 ppm. The pH of the sodium chlorite was then adjusted using any GRAS acid such as citric acid or sodium bisulfate to about 2.4 to about 2.6. The second solution of octanoic acid was prepared containing from about 1,000 ppm to about 10,000 ppm of octanoic acid, from about 1.0 to about 4.0 wt. % ethylene oxide/propylene oxide copolymer (Pluronic F108), and about 2.0 to about 6.0 wt. % propylene glycol. The octanoic acid solution was adjusted to pH 2.0 with any GRAS acid such as phosphoric acid.

TABLE 6

An Acidified Sodium Chlorite (ASC) Composition Containing:

| Level (ppm) | Raw Material |
|---|---|
| 1200 | Sodium Chlorite |
| 6000 | Citric Acid |

Final Solution pH ~2.5

TABLE 7

An Octanoic Acid Composition Containing:

| Level (Wt. %) | Raw Material |
|---|---|
| 2.85 | Pluronic F108 |
| 5.00 | Propylene Glycol |

TABLE 7-continued

An Octanoic Acid Composition Containing:

| Level (Wt. %) | Raw Material |
|---|---|
| 0.20 | Phosphoric Acid (75%) |
| 1.00 | Octanoic Acid |

Final Solution pH ~2.0

An equal-part mixture of five strains of *L. monocytogenes* including ATCC 19112, ATCC 19114, ATCC 19115, ATCC 7644, and NCTC 10890, suspended in Dey Engley Broth, was used as the inoculum. 0.1 milliliters of the inoculum was placed onto each RTE turkey breast, spread with a sterile bent glass rod, followed by storage at 5° C. for 10 minutes to allow for bacterial attachment. The acidified sodium chlorite solution was sprayed on the surface of the RTE product. Immediately after, the turkey breasts were placed into bags. The octanoic acid solution was then applied to the RTE product in the bag. In this example, the volume of each of the antimicrobial composition applied to each RTE turkey breasts was about 15 milliliters. The bags were immediately vacuum-packaged, and submerged in 200° F. water for 2 seconds to simulate passage through a shrink tunnel. The bags were then submerged in a 2° C. water bath for >1 minute. Two replicates were completed per treatment. The samples were stored at 5° C. for up to 14 days before analyzed for populations of *L. monocytogenes*. Fifty milliliters of University of Vermont broth were added to each bag. The RTE turkey breasts were tumbled to recover cells. The resulting suspension was plated in Modified Oxford Medium Agar and the plates were incubated at 35° C. for 72 hours prior to enumeration of *L. monocytogenes*.

TABLE 8

Efficacy of Acidified Sodium Chlorite and Octanoic Acid and Heat on *L. monocytogenes* on RTE Turkey

| | 1 day of storage | | 14 days of storage | |
|---|---|---|---|---|
| Treatment | Average $Log_{10}$ CFU/sample | Average $Log_{10}$ Reduction | Average $Log_{10}$ CFU/sample | Average $Log_{10}$ Reduction |
| None (Control) | 4.09 | NA | 5.19 | NA |
| ASC | 2.15 | 1.94 | 2.05 | 3.14 |
| ASC & Octanoic Acid | 1.94 | 2.15 | <1.70 | >3.49 |

*a* Limit of detection of the assay was 1.70 $log_{10}$ CFU/sample

Sequential treatment with acidified sodium chlorite and octanoic acid resulted in superior anti-listerial efficacy on RTE turkey breasts following 14 days of storage over treatment with ASC alone.

Example 6

The following example demonstrates the improved efficacy of sequential treatment with an oxidative composition followed by a fatty acid solution in killing *Escherichia coli* O157:H7 on raw beef brisket when used in the method.

For this example, aqueous solutions of 225 ppm peroxyacid and 0.9% octanoic acid were prepared containing the following compositions:

TABLE 9

A Peroxyacid Composition Containing:

| Level (ppm) | Raw Material |
|---|---|
| 775 | Acidic Acid |
| 225 | Mixed Percarboxylic Acids* |
| 140 | Octanoic Acid |
| 75 | Hydrogen Peroxide |
| 10 | HEDP |

*Mixture of peroxyacetic and peroxyoctanoic acids
Final Solution pH ~1.5

TABLE 10

An Octanoic Acid Composition Containing:

| Level (%) | Raw Material |
|---|---|
| 2.50 | Citric Acid |
| 1.65 | Potassium Hydroxide |
| 2.50 | Propylene Glycol |
| 5.00 | Polysorbate 20 |
| 0.90 | Octanoic Acid |

Final Solution pH ~3.7

An equal-part mixture of five strains of *E. coli* O157:H7 including E0137, E0139, ATCC 35150, ATCC 43890, and LJF557 suspended in Dey Engley Broth, was used as the inoculum. One-hundred microliters of the inoculum was pipetted onto each brisket sample which were stored at 5° C. for 1 hour to allow for bacterial attachment. One set of inoculated brisket samples was placed in shrink-film bags and 6.5 mL of a 0.9% octanoic acid solution was dispensed over each sample. Bags were vacuum-sealed and heat shrunk to distribute the treatment solution over the surfaces of the samples. A second set of inoculated brisket samples was sprayed with a 225 ppm peroxyacid solution and packaged as described. A third set of inoculated brisket samples was sprayed with a 225 ppm peroxyacid solution, placed in shrink-film bags, treated with 6.5 mL of a 1% octanoic acid solution, and vacuum-sealed and heat shrunk as described. A fourth set of inoculated brisket samples was not treated and used as a control to calculate log reductions in the population of *E. coli* O157:H7 achieved by each treatment. After a 24-hour storage period at 5° C., the pathogen was recovered into Dey Engley Broth and enumerated on CT-SMAC agar.

TABLE 11

Efficacy of Sequential Treatment with 225 ppm Peroxyacid and 0.9% Octanoic Acid in killing *E. coli* O157:H7 on Raw Beef Brisket

| Treatment #1 | Treatment #2 | Average $Log_{10}$ CFU/sample | Average $Log_{10}$ Reduction Vs. Control |
|---|---|---|---|
| None (Control) | None (Control) | 6.83 | Not Applicable |
| Octanoic Acid Solution | None | 6.02 | 0.81 |
| Peroxyacid Acid Solution | None | 5.87 | 0.96 |
| Peroxyacid Acid Solution | Octanoic Acid Solution | 5.63 | 1.20 |

Treatment of raw beef brisket with peroxyacid followed by an in-package treatment using octanoic acid achieved a greater log reduction in *E. coli* O157:H7 populations than the log reduction achieved by each treatment applied individually.

Example 7

The following example demonstrates the improved efficacy of sequential treatment with an oxidative composition followed by a fatty acid solution in killing *Escherichia coli* O157:H7 on raw beef brisket when used in the method.

For this example, aqueous solutions of 1000 ppm acidified sodium chlorite and 0.9% octanoic acid were prepared with the following compositions:

TABLE 12

An Acidified Sodium Chlorite Composition Containing:

| Level (ppm) | Raw Material |
|---|---|
| 1000 | Sodium Chlorite |
| 6750 | Citric Acid |

Final Solution pH ~2.45

TABLE 13

An Octanoic Acid Composition Containing:

| Level (%) | Raw Material |
|---|---|
| 2.50 | Citric Acid |
| 2.50 | Propylene Glycol |
| 5.00 | Polysorbate 20 |
| 0.90 | Octanoic Acid |

Final Solution pH ~2.1

An equal-part mixture of five strains of *E. coli* O157:H7 including E0137, E0139, ATCC 35150, ATCC 43890, and LJF557 suspended in Dey Engley Broth, was used as the inoculum. One-hundred microliters of the inoculum was pipetted onto each brisket sample which were stored at 5° C. for 1.75 hours to allow for bacterial attachment. One set of inoculated brisket samples was placed in shrink-film bags and 6.5 mL of a 0.9% octanoic acid solution was dispensed over each sample. Bags were vacuum-sealed and heat shrunk 2 seconds at 200° F. to distribute the treatment solution over the surfaces of the samples. A second set of inoculated brisket samples was sprayed with 75 milliliters of a 1000 ppm acidified sodium chlorite solution and packaged as described. A third set of inoculated brisket samples was sprayed with a 1000 ppm acidified sodium chlorite solution, placed in shrink-film bags, treated with 6.5 mL of a 0.9% octanoic acid solution, and vacuum-sealed and heat shrunk as described. A fourth set of inoculated brisket samples was not treated and used as a control to calculate log reductions in the population of *E. coli* O157:H7 achieved by each treatment. After a 24-hour storage period at 5° C., the pathogen was recovered into Dey Engley Broth and enumerated on CT-SMAC agar.

TABLE 14

Efficacy of Sequential Treatment with 1000 ppm Peroxyacetic acid and 0.9% Octanoic Acid in killing *E. coli* O157:H7 on Raw Beef Brisket

| Treatment #1 | Treatment #2 | Average $Log_{10}$ CFU/sample | Average $Log_{10}$ Reduction Vs. Control |
|---|---|---|---|
| None (Control) | None (Control) | 6.17 | Not Applicable |
| Octanoic Acid Solution | None | 5.05 | 1.12 |
| Acidified Sodium Chlorite Solution | None | 5.23 | 0.94 |
| Acidified Sodium Chlorite | Octanoic Acid Solution | 4.48 | 1.69 |

Treatment of raw beef brisket with acidified sodium chlorite followed by an in-package treatment using octanoic acid achieved a greater log reduction in *E. coli* O157:H7 populations than the log reduction achieved by each treatment applied individually.

Example 8

The following example demonstrates the improved efficacy of sequential treatment with an oxidative composition followed by a fatty acid solution in killing *Escherichia coli* O157:H7 on raw beef flanks when used in the method.

For this example, aqueous solutions of 1000 ppm acidified sodium chlorite and 0.9% octanoic acid were prepared with the following compositions:

TABLE 15

Acidified Sodium Chlorite Composition Containing:

| Level (ppm) | Raw Material |
|---|---|
| 1000 | Sodium Chlorite |
| 6750 | Citric Acid |

Final Solution pH ~2.48

TABLE 16

An Octanoic Acid Composition Containing;

| Level (%) | Raw Material |
|---|---|
| 2.50 | Citric Acid |
| 2.50 | Propylene Glycol |
| 5.00 | Polysorbate 20 |
| 0.90 | Octanoic Acid |

Final Solution pH ~2.06

An equal-part mixture of five strains of *E. coli* O157:H7 including E0137, E0139, ATCC 35150, ATCC 43890, and LJF557 suspended in Dey Engley Broth, was used as the inoculum. One-hundred microliters of the inoculum was pipetted onto each flank sample which were stored at 5° C. for 1 hour to allow for bacterial attachment. One set of inoculated flank samples was placed in shrink-film bags and 6.5 mL of a 0.9% octanoic acid solution was dispensed over each sample. Bags were vacuum-sealed and heat shrunk 2 seconds at 200° F. to distribute the treatment solution over the surfaces of the samples. A second set of inoculated flank samples was sprayed with 75 milliliters of a 1000 ppm acidified sodium chlorite solution and packaged as described. A third set of inoculated flank samples was sprayed with a 1000 ppm acidified sodium chlorite solution, placed in shrink-film bags, treated with 6.5 mL of a 0.9% octanoic acid solution, and vacuum-sealed and heat shrunk as described. A fourth set of inoculated flank samples was not treated and used as a control to calculate log reductions in the population of *E. coli* O157:H7 achieved by each treatment. After a 24-hour storage period at 5° C., the pathogen was recovered into Dey Engley Broth and enumerated on CT-SMAC agar.

TABLE 17

Efficacy of Sequential Treatment with 1000 ppm
Peroxyacetic acid and 0.9% Octanoic Acid in killing
*E. coli* O157:H7 on Raw Beef Flanks

| Treatment #1 | Treatment #2 | Average $Log_{10}$ CFU/sample | Average $Log_{10}$ Reduction Vs. Control |
|---|---|---|---|
| None (Control) | None (Control) | 6.28 | Not Applicable |
| Octanoic Acid Solution | None | 5.15 | 1.13 |
| Acidified Sodium Chlorite | None | 4.58 | 1.70 |
| Acidified Sodium Chlorite | Octanoic Acid Solution | 4.48 | 1.80 |

Treatment of raw beef flank with acidified sodium chlorite followed by an in-package treatment using octanoic acid achieved a greater log reduction in *E. coli* O157:H7 populations than the log reduction achieved by each treatment applied individually.

Example 9

The following example demonstrates the improved efficacy of sequential treatment with an oxidative composition followed by a fatty acid solution in killing *Escherichia coli* O157:H7 and spoilage-causing psychrotrophic bacteria on raw beef flanks when used in the method.

For this example, aqueous solutions of 1.0% octanoic acid and 1020 ppm Acidified Sodium Chlorite (ASC) solution were prepared with the following compositions:

TABLE 18

An Octanoic Acid Composition Containing:

| Level (%) | Raw Material |
|---|---|
| 2.5 | Citric Acid |
| 3.0 | Polysorbate 20 |
| 1.0 | Octanoic Acid |

Final Solution pH ~2.2

TABLE 19

An Acidified Sodium Chlorite Composition Containing:

| Level (ppm) | Raw Material |
|---|---|
| 1020 | Sodium Chlorite |
| 6,707 | Citric Acid |

Final Solution pH ~2.45

An equal-part mixture of five strains of *E. coli* O157:H7 including E0137, E0139, ATCC 35150, ATCC 43890, and LJF557 suspended in phosphate buffered dilution water, was used as the inoculum. One-hundred microliters of the inoculum was pipetted onto each flank sample which were stored at 5° C. for 1 hour to allow for bacterial attachment. Flank samples were grouped into sets of three samples each. One set of inoculated flank samples was placed in shrink-film bags and 6.5 mL of a 1% octanoic acid solution was dispensed over each sample. Bags were vacuum-sealed and heat shrunk to distribute the treatment solution over the surfaces of the samples. A second set of inoculated flank samples was sprayed with a 1020 ppm acidified sodium chlorite solution and packaged as described above. A third set of inoculated flank samples was sprayed with a 1020 ppm acidified sodium chlorite solution, placed in shrink-film bags, treated with 6.5 mL of a 1% octanoic acid solution, and vacuum-sealed and heat shrunk as described. A fourth set of inoculated flank samples was not treated and used as a control to calculate log reductions in the population of *E. coli* O157:H7 achieved by each treatment. After a storage at 5° C. for 24 hours, the pathogen was recovered into Dey Engley Broth and enumerated on CT-SMAC agar. After storage at 5° C. for 20 days, psychrotrophic bacteria were enumerated from flank samples from each of the four groups by recovery in Dey Engley Broth and plating on tryptone glucose extract agar. Plates were incubated for up to 14 days following incubation at 5° C.

TABLE 20

Efficacy of Sequential Treatment with Acidified
Sodium Chlorite and 1.0% Octanoic Acid in killing
*E. coli* O157:H7 on Raw Beef Flanks

| Test | Treatment #1 | Treatment #2 | Average $Log_{10}$ CFU/sample | Average $Log_{10}$ Reduction Vs. Control |
|---|---|---|---|---|
| 1 | 1% Octanoic Acid Solution | None | 5.40 | 0.73 |
| 2 | 1020 ppm Acidified Sodium Chlorite solution | None | 4.75 | 1.38 |
| 3 | 1020 ppm Acidified Sodium Chlorite solution | 1% Octanoic Acid Solution | 4.28 | 1.85 |
| 4 | None (Control) | None (Control) | 6.13 | Not Applicable |

TABLE 21

Efficacy of Sequential Treatment with Acidified
Sodium Chlorite and 1.0% Octanoic Acid in killing
psychrotrophic bacteria on Raw Beef Flanks

| Test | Treatment #1 | Treatment #2 | Average $Log_{10}$ CFU/sample | Average $Log_{10}$ Reduction Vs. Control |
|---|---|---|---|---|
| 1 | 1% Octanoic Acid Solution | None | 6.78 | 1.76 |
| 2 | 1020 ppm Acidified Sodium Chlorite solution | None | 7.82 | 0.72 |
| 3 | 1020 ppm Acidified Sodium Chlorite solution | 1% Octanoic Acid Solution | 4.80 | 3.74 |
| 4 | None (Control) | None (Control) | 8.54 | Not Applicable |

Treatment of raw beef flanks with Acidified Sodium Chlorite followed by an in-package treatment using octanoic acid achieved a greater log reduction in *E. coli* O157:H7 and spoilage-causing psychrotrophic bacteria populations than the log reduction achieved by each treatment applied individually.

Example 10

The following example demonstrates the improved efficacy of sequential treatment with an oxidative composition followed by a fatty acid solution in killing *Escherichia coli* O157:H7 on raw beef flanks when used in the method.

For this example, aqueous solutions of 1.0% octanoic acid acidulated with either citric acid or lactic acid and 966 ppm Acidified Sodium Chlorite (ASC) solution were prepared with the following compositions:

TABLE 22

An Octanoic Acid Composition Acidulated with Citric Acid Containing:

| Level (%) | Raw Material |
| --- | --- |
| 5.0 | Citric Acid |
| 3.5 | Polysorbate 20 |
| 1.0 | Octanoic Acid |

Final Solution pH ~2.2

TABLE 23

An Octanoic Acid Composition Acidulated with Lactic Acid Containing:

| Level (%) | Raw Material |
| --- | --- |
| 8.8 | Lactic Acid |
| 10.0 | Propylene Glycol |
| 0.5 | Pluronic F108 |
| 1.0 | Octanoic Acid |

Final Solution pH ~2.0

TABLE 24

An Acidified Sodium Chlorite Composition Containing:

| Level (ppm) | Raw Material |
| --- | --- |
| 1000 | Sodium Chlorite |
| 6,750 | Citric Acid |

Final Solution pH ~2.43

An equal-part mixture of five strains of *E. coli* O157:H7 including E0137, E0139, ATCC 35150, ATCC 43890, and LJF557 suspended in Dey Engley Broth, was used as the inoculum. One-hundred microliters of the inoculum was pipetted onto each flank sample which were stored at 5° C. for 1 hour to allow for bacterial attachment. Flank samples were grouped into sets of three samples each. One set of inoculated flank samples was placed in shrink-film bags and 6.5 mL of a 1% octanoic acid solution acidulated with citric acid was dispensed over each sample. Bags were vacuum-sealed and heat shrunk to distribute the treatment solution over the surfaces of the samples. A second set of inoculated flank samples was sprayed with a 1000 ppm acidified sodium chlorite solution and packaged as described above. A third set of inoculated flank samples was sprayed with a 1000 ppm acidified sodium chlorite solution, placed in shrink-film bags, treated with 6.5 mL of a 1% octanoic acid solution acidulated with citric acid, and vacuum-sealed and heat shrunk as described. A fourth set of inoculated flank samples was placed in shrink-film bags and 6.5 mL of a 1% octanoic acid solution acidulated with lactic acid was dispensed over each sample. Bags were vacuum-sealed and heat shrunk to distribute the treatment solution over the surfaces of the samples. A fifth set of inoculated flank samples was sprayed with a 1000 ppm acidified sodium chlorite solution, placed in shrink-film bags, treated with 6.5 mL of a 1% octanoic acid solution acidulated with lactic acid, and vacuum-sealed and heat shrunk as described. A sixth set of inoculated flank samples was not treated and used as a control to calculate log reductions in the population of *E. coli* O157:H7 achieved by each treatment. After a 24-hour storage period at 5° C., the pathogen was recovered into Dey Engley Broth and enumerated on CT-SMAC agar.

TABLE 25

Efficacy of Sequential Treatment with Acidified Sodium Chlorite and 1.0% Octanoic Acid in killing *E. coli* O157:H7 on Raw Beef Flanks

| Test | Treatment #1 | Treatment #2 | Average $Log_{10}$ CFU/sample | Average $Log_{10}$ Reduction Vs. Control |
| --- | --- | --- | --- | --- |
| 1 | 1% Octanoic Acid Solution acidulated with citric acid | None | 4.42 | 1.34 |
| 2 | 1000 ppm Acidified Sodium Chlorite solution | None | 4.30 | 1.46 |
| 3 | 1000 ppm Acidified Sodium Chlorite solution | 1% Octanoic Acid Solution acidulated with citric acid | 3.53 | 2.23 |
| 4 | 1% Octanoic Acid Solution acidulated with lactic acid | None | 3.40 | 2.30 |
| 5 | 1000 ppm Acidified Sodium Chlorite solution | 1% Octanoic Acid Solution acidulated with lactic acid | 2.86 | 2.90 |
| 6 | None (Control) | None (Control) | 5.76 | Not Applicable |

Treatment of raw beef flanks with Acidified Sodium Chlorite followed by an in-package treatment using octanoic acid acidified with either citric acid or lactic acid achieved a greater log reduction in *E. coli* O157:H7 populations than the log reduction achieved by each treatment applied individually.

Example 11

The following example demonstrates the improved efficacy of sequential treatment with an oxidative composition followed by a fatty acid solution in killing *Escherichia coli* O157:H7 on raw beef flanks when used in the method.

For this example, aqueous solutions of 1.0% octanoic acid acidulated with lactic acid and 1,023 ppm Acidified Sodium Chloride (ASC) solution were prepared with the following compositions:

TABLE 26

An Octanoic Acid Composition Acidulated with Lactic Acid Containing:

| Level (%) | Raw Material |
| --- | --- |
| 2.4 | Lactic Acid |
| 3.5 | Tween 20 |
| 1.0 | Octanoic Acid |

Final Solution pH ~2.3

TABLE 27

An Acidified Sodium Chlorite Composition Containing:

| Level (ppm) | Raw Material |
|---|---|
| 1,000 | Sodium Chlorite |
| 1,400 | Sodium Acid Sulfate |

Final Solution pH ~2.5

An equal-part mixture of five strains of *E. coli* O157:H7 including E0137, E0139, ATCC 35150, ATCC 43890, and LJF557 suspended in Dey Engley Broth, was used as the inoculum. One-hundred microliters of the inoculum was pipetted onto each flank sample which were stored at 5° C. for 1 hour to allow for bacterial attachment. Flank samples were grouped into sets of three samples each. One set of inoculated flank samples was placed in shrink-film bags and 6.5 mL of a 1% octanoic acid solution acidulated with lactic acid was dispensed over each sample. Bags were vacuum-sealed and heat shrunk to distribute the treatment solution over the surfaces of the samples. A second set of inoculated flank samples was sprayed with a 1000 ppm acidified sodium chlorite solution and packaged as described above. A third set of inoculated flank samples was sprayed with a 1000 ppm acidified sodium chlorite solution, placed in shrink-film bags, treated with 6.5 mL of a 1% octanoic acid solution acidulated with lactic acid, and vacuum-sealed and heat shrunk as described. A fourth set of inoculated flank samples was not treated and used as a control to calculate log reductions in the population of *E. coli* O157:H7 achieved by each treatment. After a 24-hour storage period at 5° C., the pathogen was recovered into Dey Engley Broth and enumerated on CT-SMAC agar.

TABLE 28

Efficacy of Sequential Treatment with Acidified Sodium Chlorite and 1.0% Octanoic Acid in killing *E. coli* O157:H7 on Raw Beef Flanks

| Test | Treatment #1 | Treatment #2 | Average $Log_{10}$ CFU/sample | Average $Log_{10}$ Reduction Vs. Control |
|---|---|---|---|---|
| 1 | 1% Octanoic Acid Solution acidulated with lactic acid | None | 4.59 | 1.09 |
| 2 | 1000 ppm Acidified Sodium Chlorite solution | None | 3.53 | 2.15 |
| 3 | 1000 ppm Acidified Sodium Chlorite solution | 1% Octanoic Acid Solution acidulated with lactic acid | 3.18 | 2.50 |
| 4 | None (Control) | None (Control) | 5.68 | Not Applicable |

Treatment of raw beef flanks with Acidified Sodium Chlorite followed by an in-package treatment using octanoic acid acidified with lactic acid achieved a greater log reduction in *E. coli* O157:H7 populations than the log reduction achieved by each treatment applied individually.

Example 12

The following example demonstrates the ongoing technical effect with the inclusion of preservative agents to the antimicrobial composition. An octanoic acid (OA) solution treatment with and without preservative agents was applied to fresh beef briskets and naturally occurring populations of psychrotrophic bacteria were measured after refrigerated storage.

One of three treatment solutions was applied to cut beef brisket samples. 1) a solution of 1% OA using Polysorbate 20 as a coupler, acidified to pH 5.5 using citric acid; 2) a solution of 1% OA using Polysorbate 20 as a coupler, 2,600 ppm benzoic acid, 750 ppm sorbic acid, acidified to pH 4.2 using citric acid; 3) water control. Samples of cut beef brisket (10 cm×20 cm×5.5 cm) were prepared and placed in shrink bags. 15 ml of one of the treatment solution was added to each bag. Bags were vacuum-packaged, submersed in 200° F. water for 2 seconds to simulate passage through a shrink tunnel and stored at 10° C. for up to 21 days. Three replicates per treatment were completed.

Samples were removed from storage after 3 or 21 days and analyzed for populations of psychrotrophic microorganisms. 50 ml of 2× Dey/Engley Neutralizing medium were added to each sample bag. Samples were tumbled for 50 rotations in a rotary tumbler and resulting suspension was plated on tryptone glucose extract agar. Plates were incubated at 10° C. for 7 days prior to enumeration of CFU per sample.

TABLE 29

Efficacy of 1.0% Octanoic Acid with and without Preservatives in Controlling Populations of Psychrotrophic bacteria on Raw Beef Brisket.

| Treatment Solution | Average $Log_{10}$ CFU/sample At Day 3 | Average $Log_{10}$ Reduction Vs. Control At Day 3 | Average $Log_{10}$ CFU/sample At Day 21 | Average $Log_{10}$ Reduction Vs. Control At Day 21 |
|---|---|---|---|---|
| 1% Octanoic Acid Solution acidulated with citric acid to pH 5.5 | 5.82 | 1.12 | 9.68 | 0.77 |
| 1% Octanoic Acid Solution, with 2,600 ppm benzoic acid and 750 ppm sorbic acid acidulated with citric acid to pH 4.2 | 5.86 | 1.08 | 7.80 | 2.65 |
| Water Control | 6.94 | n/a | 10.46 | n/a |

The use of sorbic acid and benzoic acid in combination with an octanoic acid solution provided control of psychrotrophic bacteria on raw beef Briskets.

Example 13

Beef tenderloin was treated with two compositions containing octanoic acid and inspected visually for their desirability factor based on color by a sensory panel of at least 12 people. The first composition was formulated at pH 3.7 and the second was formulated at pH 5.5. Compositions were added into the vacuum-package bag which contained the beef tenderloin samples. One subset of beef tenderloin samples was left untreated and served as a control. Following treatment, samples were vacuum packed and stored for three days at 2-8° C. Samples were then removed from vacuum-packages and cut into steaks. Steaks were held aerobically for up to 2 days at 2-8° C. At 2 hours and 2 days of storage, steaks were removed from storage at 2-8° C. and inspected for desirability based on color. A score of 1 indicates the panelist disliked very much the color of the steaks. A score of 5 indicates the panelist liked very much the color of the steaks. The threshold of desirability was held at a score of 2.5. Results show that the beef tenderloin treated with the composition at pH 5.5 remained above the desirability threshold throughout the 2 day storage time, whereas the desirability of the control steaks reduced substantially over the same period. Steaks treated with the composition at pH 3.7 where not acceptable at either time point analyzed.

TABLE 30

Quality of Beef Tenderloin treated with Octanoic Acid formulated at pH 5.5 or pH 3.7.

| | Aerobic Storage Time | |
|---|---|---|
| Treatment Solution | 2 hours | 2 days |
| 1% Octanoic Acid Solution acidulated with citric acid to pH 3.7 | 1.4 | 1.8 |
| 1% Octanoic Acid Solution acidulated with citric acid to pH 5.5 | 3.1 | 2.8 |
| Control | 4.5 | 2.2 |

Hedonic scale; 1 = dislike very much; 5 = like very much.

Example 14

The following is an example of an octanoic acid composition used in the method of the present invention where the octanoic acid composition is increased by use of mechanical tenderizing or flavoring of the raw meat or poultry product.

TABLE 31

Octanoic Acid Use-Solution Composition

| Level (wt %) | Raw Material |
|---|---|
| 93.94 | Water |
| 1.23 | Sodium Citrate/Citric Acid Buffer |
| 2.13 | Propylene Glycol |
| 1.75 | Tween 20 |
| 0.5 | Tween 80 |
| 0.45 | Octanoic Acid |

For this example, a 24 hour culture of *Escherichia coli* O157:H7 EDL933 ATCC 700927 (gentamicin resistant variant), grown in Tryptic Soy broth (TSB) with 15 μg/mL gentamicin, was diluted 1/10 in phosphate buffered dilution water (PBDW) and used as the inoculum. 0.1 milliliters (mL) of the inoculum was placed on the top surface of a Top Sirloin steak (cut to 500-1000 g and ¾ inch thick), spread with a sterile spreader and followed by storage at ambient temperature (18-22° C.) for 5 minutes to allow for bacterial attachment. Steaks were then soaked in the antimicrobial substance described in Table 31 for 5 minutes (3 steaks per treatment per sample step). In this example, the amount of antimicrobial substance used was equivalent to the amount needed to completely submerge the steaks. After exposure, steaks were removed from the antimicrobial substance, gently shaken to remove excess liquid and immediately mechanically tenderized using a handheld Jaccard (model number 200348).

Three steaks each were collected, after inoculation, after treatment and after mechanical tenderization. Each steak was placed in a stomacher bag containing 100 mL Dey Engley (DE) broth. Samples were then stomached for 60 seconds at 260 rpm to recover the surviving populations of *E. coli* O157: H7. The resulting suspension was diluted in PBDW, plated on Tryptic Soy agar (TSA) with 15 μg/mL gentamicin and incubated at 35° C. for 24 hours prior to enumeration of *E. coli* O157:H7.

TABLE 32

Efficacy of 0.45% Octanoic Acid on *E. coli* O157:H7 After Mechanical Tenderization on Raw Steak

| Treatment Solution | Sample Step | Average $Log_{10}$ CFU/sample | Step-wise $Log_{10}$ Reduction | Total $Log_{10}$ Reduction |
|---|---|---|---|---|
| no treatment | post inoculation | 6.96 | n/a | n/a |
| 4500 ppm octanoic acid | post treatment | 6.69 | 0.27 | 0.70 |
| | post mechanical tenderization | 6.53 | 0.43 | |

Following treatment with 0.45% octanoic acid a 0.27 log reduction of *E. coli* O157:H7 was observed after the treatment step. The reduction observed after the mechanical tenderizing step increased a 0.43 log reduction of *E. coli* O157: H7, with a total log reduction of 0.70 logs observed with the combination of the 2 steps.

Example 15

The following example determined the efficacy of 0.45% octanoic acid at reducing *E. coli* O157:H7 transferred from steak to steak by the mechanical tenderizer apparatus.

For this example, a 24 hour culture of *Escherichia coli* O157:H7 EDL933 ATCC 700927 (gentamicin resistant variant), grown in TSB with 15 μg/mL gentamicin, was diluted 1/10 in PBDW and used as the inoculum. 0.1 mL of the inoculum was placed on the top surface of a Top Sirloin steak (cut to 500-1000 g and ¾ inch thick), spread with a sterile spreader and followed by storage at ambient temperature (18-22° C.) for 5 minutes to allow for bacterial attachment. One steak was then soaked in the antimicrobial substance described in Table 31 for 5 minutes. In this example, the amount of antimicrobial substance used was equivalent to the amount needed to completely submerge the steak. After exposure, steak was removed from the antimicrobial substance, gently shaken to remove excess liquid and immediately mechanically tenderized using a handheld, clean and sanitized Jaccard (model number 200348). After mechanical tenderization of the inoculated/treated steak, the same Jaccard apparatus was used to tenderize three uninoculated/untreated steaks. This exact process was then repeated with another set of steaks (one inoculated/treated and 3 uninocualted/untreated). The control steak was an inoculated/untreated steak sample that was mechanically tenderized using a clean, sanitized Jaccard, then using the same Jaccard apparatus, mechanically tenderized three uninoculated/untreated steaks. The exact process was then repeated with another set of steaks (one inoculated/untreated and 3 uninoculated/untreated).

After mechanical tenderizing, each steak was placed in a stomacher bad containing 100 mL DE broth. Samples were then stomached for 60 seconds at 260 rpm to recover the populations of *E. coli* O157:H7. The resulting suspension was diluted in PBDW, plated on TSA with 15 μg/mL gentamicin and incubated at 35° C. for 24 hours prior to enumeration of *E. coli* O157:H7.

TABLE 33

Efficacy of 0.45% Octanoic Acid on the Transfer of E. coli O156:H7 Across Raw Steaks During Mechanical Tenderization

| Treatment Solution | Sample ID | Average Log$_{10}$ CFU/sample | Total Log$_{10}$ Reduction by Steak |
|---|---|---|---|
| Untreated Control | inoculated steak | 7.03 | n/a |
| no treatment | 1$^{st}$ mechanically tenderized steak | 5.82 | n/a |
| no treatment | 2$^{nd}$ mechanically tenderized steak | 5.42 | n/a |
| no treatment | 3$^{rd}$ mechanically tenderized steak | 5.31 | n/a |
| 4500 ppm octanoic acid | inoculated steak | 6.41 | 0.62 |
| no treatment | 1$^{st}$ mechanically tenderized steak | 4.40 | 1.42 |
| no treatment | 2$^{nd}$ mechanically tenderized steak | 3.50 | 1.92 |
| no treatment | 3$^{rd}$ mechanically tenderized steak | 3.04 | 2.27 |

The treatment of the inoculated steaks with 0.45% octanoic acid knocked down initial E. coli O157:H7 population with a 0.62 log reduction when compared to the untreated inoculated steak. When comparing the 1$^{st}$ mechanically tenderized steaks, the steak mechanically tenderized after the treated steak showed a 1.42 log reduction in E. coli O157:H7 numbers when compared to the 1$^{st}$ mechanically tenderized steak mechanically tenderized after the untreated steak. The 2$^{nd}$ and 3$^{rd}$ mechanically tenderized steaks, after mechanical tenderization of the treated steak, showed a 1.92 and 2.27 log reduction in E. coli O157:H7 numbers, respectively, when compared to the 2$^{nd}$ and 3$^{rd}$ mechanically tenderized steaks mechanically tenderized after the untreated control.

Example 16

The following example determined the efficacy of a 0.45% octanoic acid solution over 72 hour storage at refrigerated temperatures.

For this example, a 24 hour culture of *Escherichia coli* O157:H7 EDL933 ATCC 700927 (gentamicin resistant variant), grown in TSB with 15 µg/mL gentamicin, was diluted 1/10 in PBDW and used as the inoculum. 0.1 mL of the inoculum was placed on the surface of a Top Sirloin steak (cut to 500-1000 g and ¾ inch thick), spread with a sterile spreader and followed by storage at ambient temperature (18-22° C.) for 5 minutes to allow for bacterial attachment. Steaks were then soaked in the antimicrobial substance described in Table 31 for 5 minutes (3 steaks per treatment per sample step). In this example, the amount of antimicrobial substance used was equivalent to the amount needed to completely submerge the steaks. After exposure, the steaks were removed from the antimicrobial substance, gently shaken to remove excess liquid and immediately mechanically tenderized using a clean, sanitized, handheld Jaccard (model number 200348). The remaining steaks were then transferred into a liquid tenderizer/marinade. After the recommended time, the remaining steaks were allowed to drain, then transferred to a plastic storage container, on a drainage rack, with each layer of steak separated by parchment paper (steaks were allowed to touch on the sides with no direct steak to steak overlapping).

Three steaks each were collected, after inoculation, after treatment, after mechanical tenderization, after liquid tenderizer/marinade and after 72 hour storage. Each steak was placed in a stomacher bad containing 100 mL DE broth. Samples were then stomached for 60 seconds at 260 rpm to recover the populations of E. coli O157:H7. The resulting suspension was diluted in PBDW, plated on TSA with 15 µg/mL gentamicin and incubated at 35° C. for 24 hours prior to enumeration of E. coli O157:H7.

TABLE 34

Efficacy of 0.45% Octanoic Acid on E. coli O157:H7 Through Processing and Storage at Refrigerated Temperatures

| Treatment Solution | Sample ID | Average Log$_{10}$ CFU/sample | Same Day Log$_{10}$ Reduction | Total Log$_{10}$ Reduction |
|---|---|---|---|---|
| no treatment | post inoculation | 6.96 | n/a | n/a |
| 4500 ppm octanoic acid | post treatment | 6.69 | 1.18 | 2.04 |
| | post needle tenderizing | 6.53 | | |
| | post marinade | 6.48 | | |
| | post 72 hour storage | 6.10 | n/a | |

The treatment of steaks with 0.45% octanoic acid achieved a 1.18 log reduction of E. coli O157:H7 through out the same day processing, with additional efficacy observed over the 72 hour storage for a total reduction of 2.04 logs.

The foregoing summary, detailed description, and examples provide a sound basis for understanding the disclosure, and some specific example embodiments of the disclosure. Since the disclosure can comprise a variety of embodiments, the above information is not intended to be limiting. The invention resides in the claims.

What is claimed is:

1. A method of treating a meat or poultry product with an antimicrobial composition, the method comprising:
   applying an antimicrobial composition to a meat processing tool selected from the group consisting of a meat pounder, a needle tenderizer, an injector, a grinder, and combinations thereof; and using the meat processing tool to process the meat or poultry product and apply the antimicrobial composition to the surface of the meat or poultry product;
   the antimicrobial composition comprising:
      about 0.1 wt. % to about 5 wt. % octanoic acid;
      citric acid, phosphoric acid, or a mixture thereof;
      a citrate salt, a phosphate salt, or a mixture thereof;
      a sulfonate surfactant, an alkyl polyglucoside surfactant, or a mixture thereof;
      a sorbitan ester; and
      optionally, a film-forming agent.

2. The method of claim 1, wherein the processing further employs mechanical tenderizing selected from the group consisting of pounding, needle tenderizing, injecting, grinding, and combinations thereof.

3. The method of claim 1, wherein the processing further employs chemical tenderizing selected from the group consisting of aging, acids, spices, enzymes, and combinations thereof.

4. The method of claim 1, wherein the meat or poultry product is a meat product selected from the group consisting of beef, pork, veal, buffalo and lamb.

5. The method of claim 1, wherein the meat or poultry product is a poultry product selected from the group consisting of chicken, turkey, ostrich, game hen, squab, guinea fowl, pheasant, quail, duck, goose, and emu.

6. The method of claim 1, wherein the meat or poultry product is a portion selected from the group consisting of whole, sectioned, primal, sub-primal, trim, muscle, fat, organ, skin, bone and body fluid.

7. The method of claim 1, wherein the meat processing tool causes the antimicrobial composition to move to an inner surface of the meat or poultry product.

8. The method of claim 1, wherein the antimicrobial composition is additionally applied to the meat or poultry product by spraying, misting, rolling, fogging, foaming, or immersing.

9. The method of claim 8, further comprising allowing the antimicrobial composition to remain on the meat or poultry product before processing.

10. The method of claim 9, wherein the antimicrobial composition remains on the meat or poultry product for at least about 30 seconds before processing.

11. The method of claim 9, wherein the antimicrobial composition remains on the meat or poultry product for at least about 1 minute before processing.

12. The method of claim 1, wherein the antimicrobial composition is applied at temperatures from about 1 ° C. to about 30 ° C.

13. The method of claim 1, further comprising at least one step selected from the group consisting of slicing, applying a second antimicrobial product, marinating, packaging, storing, applying activation energy, and selling.

14. The method of claim 1, wherein the antimicrobial composition is a concentrate composition.

15. The method of claim 1, wherein the antimicrobial composition is a ready-to-use composition.

16. The method of claim 15, wherein the ready-to-use composition contains at least 100 ppm octanoic acid.

17. The method of claim 15, wherein the ready-to-use composition contains at least 500 ppm octanoic acid.

18. The method of claim 1, the antimicrobial composition further comprises additional functional ingredients.

19. The method of claim 18, wherein the additional functional ingredients are selected from the group consisting of oxidizers, carriers, chelating agents, hydrotropes, thickening agents, gelling agents, foaming agents, film-forming agents, surfactants, coupling agents, acidulants, potentiators, flavoring aids, fragrance, dye, and mixtures thereof.

20. The method of claim 8, wherein the antimicrobial composition is applied to the meat or poultry product by soaking the meat or poultry product in the antimicrobial composition.

21. The method of claim 1, wherein the processing uses needle tenderizing.

* * * * *